(12) United States Patent
Garthwaite

(10) Patent No.: US 7,480,782 B2
(45) Date of Patent: Jan. 20, 2009

(54) REFERENCE-UPDATING USING PER-CHUNK REFERENCED-ADDRESS RANGES IN A COMPACTING GARBAGE COLLECTOR

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 223 days.

(21) Appl. No.: 11/452,533

(22) Filed: Jun. 14, 2006

(65) Prior Publication Data

US 2007/0294499 A1 Dec. 20, 2007

(51) Int. Cl.
*G06F 12/00* (2006.01)

(52) U.S. Cl. .................. 711/170; 711/165; 707/206

(58) Field of Classification Search .............. 711/165, 711/170; 707/206
See application file for complete search history.

(56) References Cited

U.S. PATENT DOCUMENTS

| | | | |
|---|---|---|---|
| 6,560,619 B1 * | 5/2003 | Flood et al. ............. | 707/206 |
| 6,760,815 B1 | 7/2004 | Traversat et al. | |
| 6,763,440 B1 | 7/2004 | Traversat | |
| 6,804,762 B1 | 10/2004 | Dussud et al. | |
| 6,823,351 B1 * | 11/2004 | Flood et al. ............. | 707/206 |
| 6,868,488 B2 | 3/2005 | Garthwaite | |
| 6,901,587 B2 | 5/2005 | Kramskoy et al. | |
| 7,010,555 B2 * | 3/2006 | Blandy et al. ............. | 707/206 |
| 2005/0149686 A1 | 7/2005 | Bacon et al. | |
| 2005/0166028 A1 | 7/2005 | Chung et al. | |
| 2005/0198079 A1 | 9/2005 | Heeb | |
| 2005/0235120 A1 | 10/2005 | Dussud | |
| 2005/0273567 A1 | 12/2005 | Blandy | |
| 2005/0278497 A1 | 12/2005 | Pliss et al. | |
| 2006/0059453 A1 | 3/2006 | Kuck et al. | |
| 2006/0092161 A1 | 5/2006 | Meeker | |

OTHER PUBLICATIONS

Wilson, Paul R., "Uniprocessor Garbage Collection Techniques," Technical Report, University of Texas, Jan. 1994.

* cited by examiner

*Primary Examiner*—Jasmine Song
(74) *Attorney, Agent, or Firm*—Robert C. Kowert; Meyertons, Hood, Kivlin, Kowert & Goetzel, P.C.

(57) ABSTRACT

Reference updating in a sliding compaction garbage collector may involve maintaining, for each logical region of the heap to be compacted, values that represent the range of addresses referenced by individual regions of the heap. For example, a highest-referenced address (HRA) represents the maximum address referenced by any object references in the respective region. Similarly, a lowest-reference address (LRA) represents the minimum address referenced by a region. When updating references during compaction, if the HRA and/or LRA for a particular region indicate that all references within the region point to addresses within a region of memory that will not be relocated during compaction, such as a dense prefix, the references with the particular region need not be updated. Maintaining HRAs and/or LRAs for region of heap memory may simplify determining whether or not references within individual regions require updating.

17 Claims, 11 Drawing Sheets

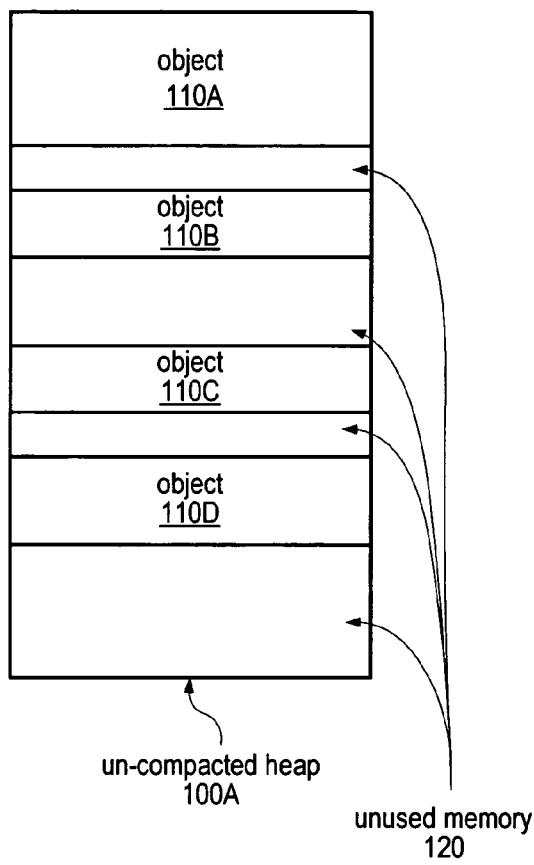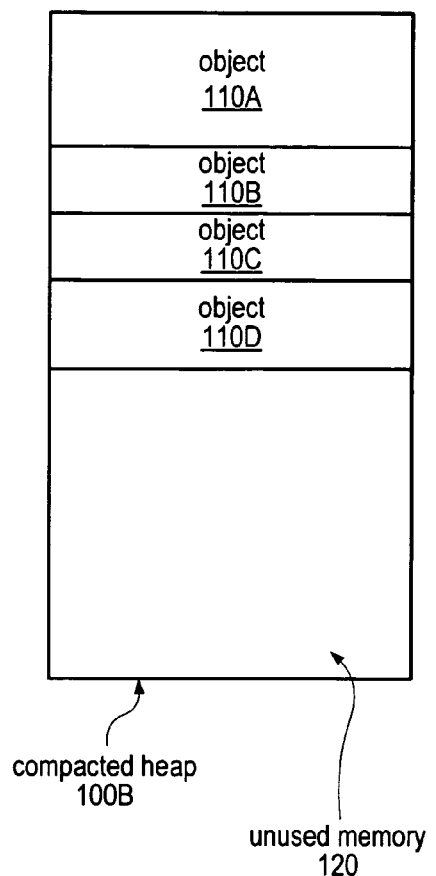
FIG. 1A
FIG. 1B

REFERENCE-UPDATING USING PER-CHUNK REFERENCED-ADDRESS RANGES IN A COMPACTING GARBAGE COLLECTOR

BACKGROUND OF THE INVENTION

1. Field of the Invention

This invention related to the field of memory management and more particularly to forward address calculations in heap compaction.

2. Description of the Related Art

In the field of computer systems, considerable effort has been expended on the task of allocating and managing memory. In general, memory may be allocated to data objects (which may also be referred to as data structures or records) either statically or dynamically. Some computer languages may require that memory be allocated for all the variables defined in a program statically, e.g., at compile time. Such static memory allocation may make it difficult to share available memory space among multiple applications, especially for applications that are long-lived. Abiding by space limitations may be easier when the platform provides support for dynamic memory allocation, i.e., when memory space to be allocated to a given object is determined at run time.

Particularly for long-lived applications though, allocation and reclamation of dynamic memory must be performed carefully. If the application fails to reclaim unused memory—or, worse, loses track of the address of a dynamically allocated segment of memory—its memory requirements may grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is generally known as a "dangling reference."

A way of reducing the likelihood of such leaks and related errors is to provide memory-space reclamation in a more automatic manner. Techniques used by systems that reclaim memory space automatically are commonly referred to as garbage collection. Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

Various parts and levels of a computing system can implement garbage collection. One approach is simply to provide garbage collection as part of a batch compiler's output. In this approach to garbage collection, in addition to generating code for the functionality supported by an application, the batch compiler may generate code that automatically reclaims unreachable memory space without explicit direction from a the programmer, and include it within the application's object code. Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage collection mechanism over a number of computer system layers.

Another approach to garbage collection may be taken in some systems that employ "virtual machines". In such a system, a compiler or an interpreter may convert source code for an application from a high-level language to instructions called "byte code" for virtual machines that various processors can be configured to emulate. One example of a high-level language for which compilers and interpreters are available to produce such virtual-machine instructions is the Java™ programming language. (Java is a trademark or registered trademark of Sun Microsystems, Inc., in the United States and other countries.) Typically, byte-code routines are executed by a processor under control of a virtual-machine process, and the virtual machine process provides memory management functions including garbage collection. For example, a memory management component of the virtual machine process may be responsible for allocating memory dynamically as needed and reclaiming unreachable memory when possible. Various other approaches to garbage collection may be employed, including implementation of garbage collection functions in hardware.

In distinguishing reachable objects from unreachable objects, garbage collectors often have to trace references between objects—for example, some garbage collectors have to identify those reference fields of an object that have been modified, as well as the objects that are referred to in the modified fields. In order to limit the amount of analysis required for collection, a record or trace of objects whose references have been modified may be maintained. Alternatively, a record or trace of the reference locations themselves may be maintained.

Garbage collection schemes, such as mark-sweep and reference-counting garbage collection techniques, are generally susceptible to fragmentation, where the heap includes more and more gaps between active, live objects. As a heap becomes more fragmented, it may become more and more difficult to allocate large spans of memory. To avoid this fragmentation problem, many garbage collectors compact the heap periodically to remove some or all of the gaps between live memory objects. Compacting a heap may coalesce the gaps into a single, contiguous block of memory, thereby allowing for larger objects to be allocated.

There are a number of traditional approaches to heap compaction. For example, one is to compact all reachable object to one end of the address range of the heap. Because groups of objects are moved in address order, this technique is often referred to as sliding compaction. This approach works well even when objects differ in size. By preserving the ordering of objects in the heap, it allows for a simple, pointer-bumping allocation scheme. The primary obstacle to the use of sliding compaction on multiprocessors is that the act of sliding object must be carefully staged so that reachable objects are not overwritten before they can be moved to their final destinations.

Compaction techniques generally require four separate operations on a heap during marking and compaction of the heap. For example, a heap compactor may first traverse the heap marking all reachable objects and then may calculate new post-compaction locations for each reachable object in the heap. Subsequently, during marking and compaction, all references to objects in the heap may be updated to refer to objects' post-compaction locations. And finally, all reachable objects may be moved (or slid) to their respective post-compaction locations. Generally, in compaction techniques, an object's destination in the compacted heap is calculated via individual object forwarding addresses, object-extent bitmaps, or break tables. The step of updating all references to reachable objects may require significant execution and processor time because the destination address for each object must be determined based upon the size of all reachable objects that will end up below (i.e. in lower heap addresses) than the object in question.

SUMMARY

Sliding compaction, as described herein, may involve distinct phases that operate on the objects in the heap and their references. During sliding compaction, the heap may first be logically divided into fixed-sized segments, or chunks, and information regarding each chunk, known as per-chunk metadata, may be saved during the marking phase of sliding compaction for use during a later, sliding, phase. In addition to the per-chunk information, information regarding the pre-compaction starting address and extent, called object extent information, may also be saved, such as in an object extent bitmap, during the marking phase of compaction. For instance, a heap compactor may traverse the heap, marking all reachable objects, and, for each reachable object, update per-chunk metadata for the chunk or chunks containing the respective object with information regarding the respective object.

In the sliding phase of compaction, live objects may be moved to their respective destinations in the heap and object references may be updated. A heap compactor may, in some embodiments, perform only two passes over objects in the heap and their references. Sliding compaction may maintain the order of objects being moved. By relying upon the per-chunk and object extent information saved during the marking phase, object references may be updated individually and independently of when the referenced objects are relocated during the sliding phase, according to some embodiments. Thus, sliding compaction may decouple the updating of object references from the relocating of objects through the use of object extent information and per-chunk metadata.

Reference updating in a sliding compaction garbage collector may involve maintaining, for each chunk of the heap to be compacted, range-edge referenced addresses or other values representing the range of addresses referenced by the respective chunk. For example, a highest-referenced address (HRA) that represents the maximum address referenced by any object references in the respective chunk may be determined, such as during the marking phase of compaction. When updating references in a chunk prior to relocating the memory in the chunk, if the HRA for a particular chunk is within a dense prefix or otherwise within a region of memory that will not be relocated, the references within the particular chunk may not need to be updated. In other words, an HRA for a respective chunk of memory to be compacted may simplify determining whether or not the references within that chunk require updating. For instance, if the HRA for a chunk of memory indicates that all references within the chunk point to objects or addresses that will not be relocated during compaction, the references in the chunk do not require updating. HRAs may be used as range-edge referenced addresses during marking and compacting when a heap is being compacted toward lower addresses. When a heap is being compacted toward higher addresses, a chunk's lowest-reference address (LRA) may be maintained and be used as range-edge referenced addresses to determine whether any references in the chunk need to be updated. Additionally, a heap may also be compacted to the middle of the range of addresses and both an LRA and a HRA may be maintained for each heap chunk. The LRA-HRA pair for a particular chunk may indicate that no reference within the chunk needs to be updated.

Range-edge referenced addresses may be maintained in various manners, according to various embodiments. In some embodiments, the range-edge referenced addresses for a particular chunk of memory may be updated throughout execution of a process, such as by using write-barrier logs to determine when individual references are updated. For example, a memory system may be configured to update a range-edge referenced address in response to a process modifying references in chunks of memory. Thus, when the heap is compacted, the range-edge referenced address for a chunk of the heap can be used to determine whether to update the individual references in the chunk. In other embodiments, range-edge referenced address values for all chunks may be calculated during the marking phase of compaction. For instance, before the marking phase of compaction, the range-edge referenced address value of each and every chunk may be reset (i.e. set to zero or some other predetermined or flag value). When compacting the heap toward lower addresses, when each chunk is scanned for references during marking, the range-edge referenced address value is set to the highest address referenced by any object (or other address reference) in the respective chunk. Subsequently, during reference updating, the range-edge referenced addresses are consulted as described above to quickly determine whether or not references in the chunk require updating.

BRIEF DESCRIPTION OF THE DRAWINGS

FIGS. 1A and 1B are block diagrams illustrating an exemplary heap before and after compaction using HRA information, according to one embodiment.

Figure 2:
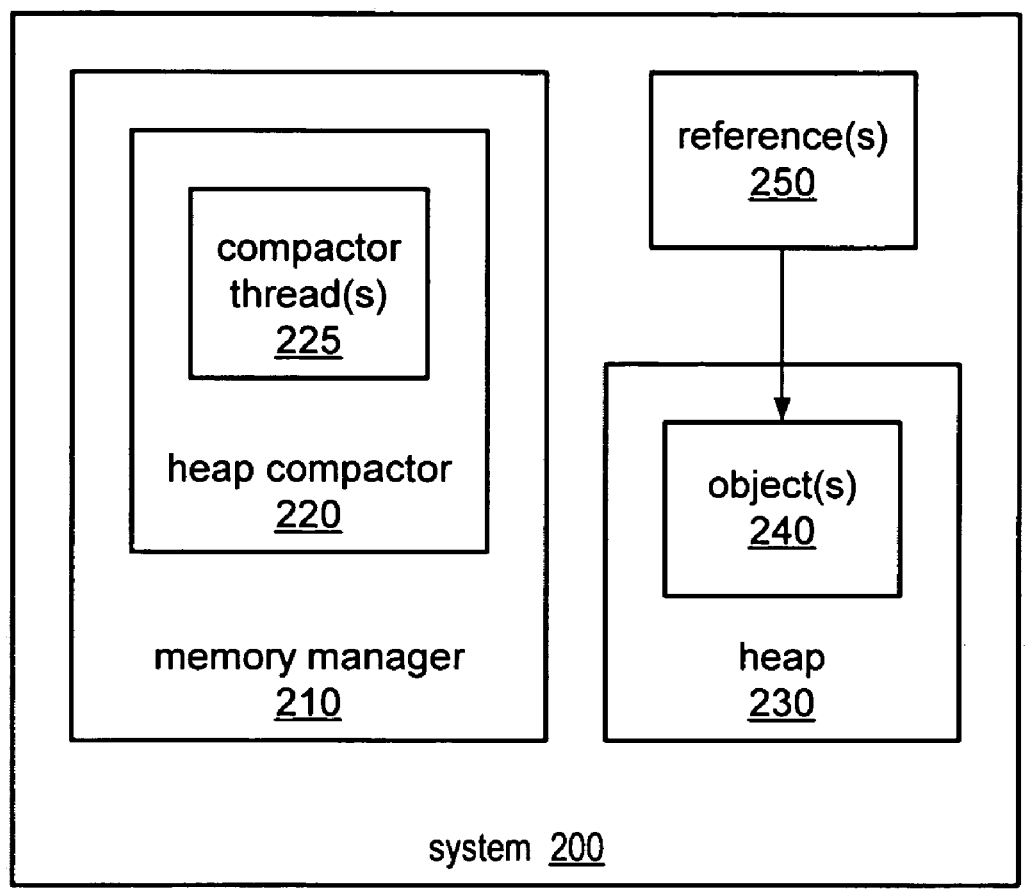
FIG. 2 is a block diagram illustrating one embodiment of a system implementing sliding compaction, as described herein.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Sliding compaction, as described herein, may involve calculating and maintaining range-edge referenced addresses, such as a highest referenced address (HRA), for respective logical chunks of a heap being compacted. FIGS. 1A and 1B illustrate a heap before (FIG. 1A) and after (FIG. 1B) compaction. For example, a heap compactor may compact uncompacted heap 100A including memory objects 110A, 110B, 110C, and 110D, as illustrated in FIG. 1A. Un-compacted heap 110A may also include one or more sections of unused memory 110. As noted above, a heap may become fragmented because of de-allocating or freeing memory objects no longer needed by applications or other processes of the system.

Compaction techniques generally include four separate operations. During the first operation, generally called the marking phase, a heap compactor may logically partition or divide un-compacted heap 100A into multiple segments or chunks of fixed, or equal, size and may determine and record per-segment or per-chunk metadata that may include HRAs as well as information such as the total amount of live memory data in the chunk and the address, either absolute or relative to the start of the chunk, of the first live memory object in the chunk. A heap compactor may be configured to maintain HRA information between heap compactions in some embodiments, while in other embodiments HRA information may be freshly determined for each compaction. As noted above, when updating object references in the heap, a heap compactor may examine the HRA value for a particular logical chunk of the heap to determine whether or not that that chunk includes at least one reference that requires updating.

In some embodiments, a lowest referenced address (LRA), rather than a highest referenced address (HRA) may be determined and used during marking and compaction as a range-edge referenced address. For example, when compacting a heap to higher addresses rather than lower addresses, chunks located at higher addresses may not be relocated and therefore a chunk's LRA may be used to determine whether or not that chunk includes at least one reference that requires updating. Additionally, in yet other embodiments, a heap may be compacted from both ends (lower and higher address) towards the middle addresses. Thus, in some embodiments, both a LRA and a HRA may be determined for each chunk and used to determine whether the chunk includes references that require updating. While described herein mainly in reference to using HRAs and compacting toward lower heap addresses, it should be noted that some embodiments may include compacting toward higher heap addresses or toward the middle of a range of heap addresses. Consequently, in some embodiments, LRAs and/or pairs of respective LRAs and HRAs may be determined, maintained in per-check metadata and may be used, at least in part, to determine whether or not a chunk includes at least one reference that requires updating. Some embodiments may additionally include various combinations of LRAs and HRA. For example, in one embodiment the heap may be compacted first in one direction, say to lower addresses, and then next in another direction, say to higher addresses. Thus, a heap compactor may use HRAs during one heap compaction and may use LRAs during a subsequent heap compaction. The descriptions herein of embodiments of heap compaction regarding the use of HRAs are extendable, with relevant variations and modifications, to embodiments of heap compaction regarding the use of LRAs and pairs of LRAs and HRAs.

Per-chunk metadata may also include a post-compaction destination address for the chunk, as well as other information discussed later, according to some embodiments. A post-compaction destination address for a chunk may represent the location in the heap of the first word of the chunk after compaction, in some embodiments. In other embodiments, a post-compaction destination address for a chunk may represent the post-compaction location of the first live memory location, i.e. the first word of the first reachable object, in the chunk. The heap compactor may record or save post-compaction destination addresses for chunks either temporarily in each object to be compacted or with other pre-chunk metadata. As noted above, a chunk's post-compaction destination address may be used as part of determining destination addresses for individual reachable objects in the chunk, as will be discussed in more detail below.

While the post-compaction address may be used to determine where a chunk may be relocated in the final compacted heap, in some embodiments, determining and maintaining the highest referenced address (HRA) for a chunk may prevent excessive or needless updating of the references within that chunk. For example, rather than determining on a reference by reference basis whether or not the reference points to an object (or other memory location) that will be relocated during compaction, the use of HRAs may allow that determination to be made on a chunk by chunk basis. If the HRA for a heap chunk is maintained, such as in the chunk's per-chunk metadata, a heap compactor may be configured to consult the HRA for each chunk and determine whether to update the references in that chunk based on the position of the chunk's HRA within the heap. Thus, a chunk's HRA value may indicate that the chunk contains at least one reference that requires updating, regardless of whether that reference points to an object in a different heap chunk, another object within the same heap chunk, or to a different address with the same object.

For example, in some embodiments, a dense prefix may be determined as part of heap compaction. A dense prefix, in some embodiments, represents a section of the heap that will not be compacted, as will be described in more detail below. For instance, the lower portion of the heap may remain compacted from a prior compaction and thus may not be compacted during a current compaction. Therefore, if a chunk only contains references to objects (or other memory locations) within such a dense prefix, the references in that respective chunk may not need to be updated since the objects in a dense prefix are not generally relocated during compaction. In other words, since object references point to the location of objects that are not going to move during compaction, there is no need to update those object references. In some embodiments, HRA values associated with heap chunks may be compared to the highest memory address in a dense prefix to determine whether or not any references within each respective chunk should be updated to reflect referenced memory locations in the heap after compaction. Please note, the location, size and/or extent of a dense prefix may be determined differently for each heap compaction, according to different embodiments.

When determining and storing per-chunk metadata, the heap compactor may trace through the heap, such as by following references to reachable objects, to determine which objects are live and/or reachable. In some embodiments, the heap compactor may update the HRA for regions or chunks of the heap as it traces though the heap. In other embodiments however, the heap compactor may not determine HRAs while tracing through the heap to determine other per-chunk metadata. Instead, in some embodiments HRA information may be updated whenever processes modify memory. Please note that HRA values may be updated whenever references internal to objects, or that point to objects within the same chunk, according to certain embodiments. Updating HRA information may be performed as part of normal memory processing, such as in response to a memory modification or de-allocation. For example, HRAs and/or LRAs may be maintained in the write-barrier as a reference location is written or updated or when scanning log-buffers recording changed locations. Alternatively, a heap compactor traversing a heap during heap compact process and updating HRA information for all logical heap chunks may be considered an eager mode of HRA updating, according to one embodiment.

In some embodiments, the per-chunk metadata may include the total amount of live memory data in un-compacted heap 100A below the chunk. In other words, the total size of all live objects in all chunks below (i.e. with lower heap addresses) a particular chunk may be stored as part of the metadata for the particular chunk. The per-chunk metadata may be stored in any suitable manner such that the information is accessible to the heap compactor on a per-chunk basis. In other words, the heap compactor may store the per-chunk metadata in a format allowing the metadata for a particular heap segment or chunk to be accessed and utilized individually. Please note that while heap compaction is described herein regarding compaction to lower addresses in a heap, a heap may also be compacted to higher address, according to various embodiments. When compacting a heap to higher heap addresses, the calculations described herein may be modified accordingly as will be apparent to those skilled in the art.

As noted above, sliding compaction may preserve the address order of all reachable objects across compaction. In other words, as illustrated in FIGS. 1A and 1B, objects 110A-110D are in the same order both before and after compaction. For example, since the ordering of objects 110A-110D may be preserved across compaction, the final address for any particular object, such as object 110D, may be determined by calculating the total size of all objects below (i.e. with lower heap addresses) that object 110D. As is apparent from FIG. 1B, the address of object 110D in compacted heap 100B corresponds to the next heap address above the total size of objects 110A-C. Thus, in one embodiment, a heap compactor may be configured to use a total size of all objects below (in heap address order) an object to determine the post-compaction destination address of the object. During compaction, the heap compactor may be configured to determine the post-compaction destination address of each object in a contiguous sequence of reachable objects based upon that object's relative offset from the start of the sequence and the destination address of the first object in the sequence.

As noted above, a heap compactor may update references in the heap to objects being relocated as part of compacting the heap. In some embodiments, as described herein, a heap compactor may use HRA values associated with each region (or chunk) of the heap to determine whether or not individual references within each respective region need to be updated. For example, if the HRA for a particular chunk indicates that at least one of the references in the chunk points to a location that may be relocated during compaction, a heap compactor may then determine whether to update the references in that chunk on a reference by reference basis, according to one embodiment. When updating a reference to another object, the heap compactor may determine the destination address of the referenced object and update the reference to that object accordingly. For example, if object 110B includes a reference to object 110D, a heap compactor, when relocating object 110B, may determine the destination address of object 110D (such as according to the relative offset of that object in a contiguous chunk of objects, as described above) and update the reference to object 110D to point to object 110D's post-compaction destination address, even though object 110D may not have been compacted yet. Thus, any references in each of objects 110A-D may be updated on an object-by-object basis either before, after, or as those objects are compacted.

Please note that a memory object, or objects, such as objects 110A-D, as used herein may be any chunk of allocated memory in a heap. In various embodiments, an object may be a JAVA programming object, a C++ programming object, or other allocated chunk of memory. Additionally, as noted above, the terms, "object" and "memory object" as used herein, both refer to a memory object that is accessible and allocated in a heap, and are used interchangeably herein. Also, the terms "reachable" and "live" may terms be used interchangeably herein. Please also note that, for clarity and ease of description, only a small number of chunks, objects and references are included in the examples and embodiments described herein. However, in other embodiments, a heap may include many more chunks, objects and references.

FIG. 2 is a block diagram of a computer system capable of implementing sliding compaction using HRA information, as described herein. As illustrated in FIG. 2, system 200 may include a memory manager 210 configured to manage the allocation and de-allocation of memory from heap 230. As part of managing heap 230, memory manager 210 may utilize a heap compactor 220 configured to implement the use of HRA information in sliding compaction, as described herein. As noted above, heap 230 may include one or more memory objects 240. Additionally, system 200 may include one or more references 250 to objects 240 in heap 230, according to some embodiments. While each of objects 240 may include one or more references to others of objects 240 in heap 230, references 250 may also reside outside of heap 230, such as in a processor cache, memory stack, call stack, and/or processor registers, according to some embodiments.

In some embodiments, memory manager 210 and/or heap compactor 220 may be configured to determine and/or maintain the highest referenced address (HRA) information for particular regions or chunks of the heap. For instance, memory manager 210 may be configured, in one embodiment, to update an HRA value for a logical chunk of the heap whenever a reference in that chunk is modified. In some embodiments, memory manager 210 (and/or heap compactor 220) may set the HRA for a region of memory to a predefined maximum value rather than updating the HRA to a specific memory location. Thus, during a subsequent compaction, heap compactor 220 may recognize the HRA as a predefined maximum location and in response update the references in that region of the heap, according to one embodiment. In another embodiment, heap compactor 220 may be configured to more accurately determine the HRA for a region (or chunk)

of the heap when that region's HRA is set to a predefine flag, such as predefined maximum value. Alternatively, in other embodiments, memory manager 210 (and/or heap compactor 220) may be configured to update the HRA for a region of the heap to accurately reflect the highest memory address referenced by any references in the region.

Additionally, heap compactor 220 may include one or more compactor threads 225 for performing compaction, including using HRA information to determine whether or not to update individual references, as will be discussed in more detail below. In some embodiments, system 200 may comprise one or more Java virtual machines and or Java runtime environments. In other embodiments, however, system 200 may include processes implemented in C/C++ or other languages. In general, sliding compaction may be implemented in any of various computer programming languages, such as the Java programming language, C, C++, etc.

As noted above, during compaction the post-compaction destination address of every reachable object may be determined and references to each object may be updated to point to an object's location after compaction. Though the use of HRA information, as described herein, only those references that actually point to memory objects that will be relocated during compaction may need to be updated and the determination of whether to update references may be made on a chunk by chunk (or region by region) basis rather a than a reference by reference basis.

In some embodiments, to determine objects' post-compaction addresses, offsets between objects, or other memory locations, arranged contiguously may, in some embodiments, be added to a previously determined post-compaction destination address either for the start of chunk, the first live object, or for the first memory location in the chunk, to efficiently determine the post-compaction addresses of objects in the chunk. Additionally, in some embodiments, gaps between objects of a chunk may be filled with deadwood objects in order to create a single contiguous block of objects so that offsets between the objects may be added to the destination address for the chunk to determine post-compaction destination addresses for the object in the chunk. In some embodiments, the deadwood used to fill gaps, such as to create a single contiguous block of objects, is retained by the compaction process, thus enabling address calculation for the block of objects. Please note that the gaps between objects, as described herein, may refer to objects that are not longer reachable and thus may be considered dead or garbage during heap compaction. However, such a gap may also be an area of memory that does not currently contain any allocated object due to heap fragmentation.

Figure 3:
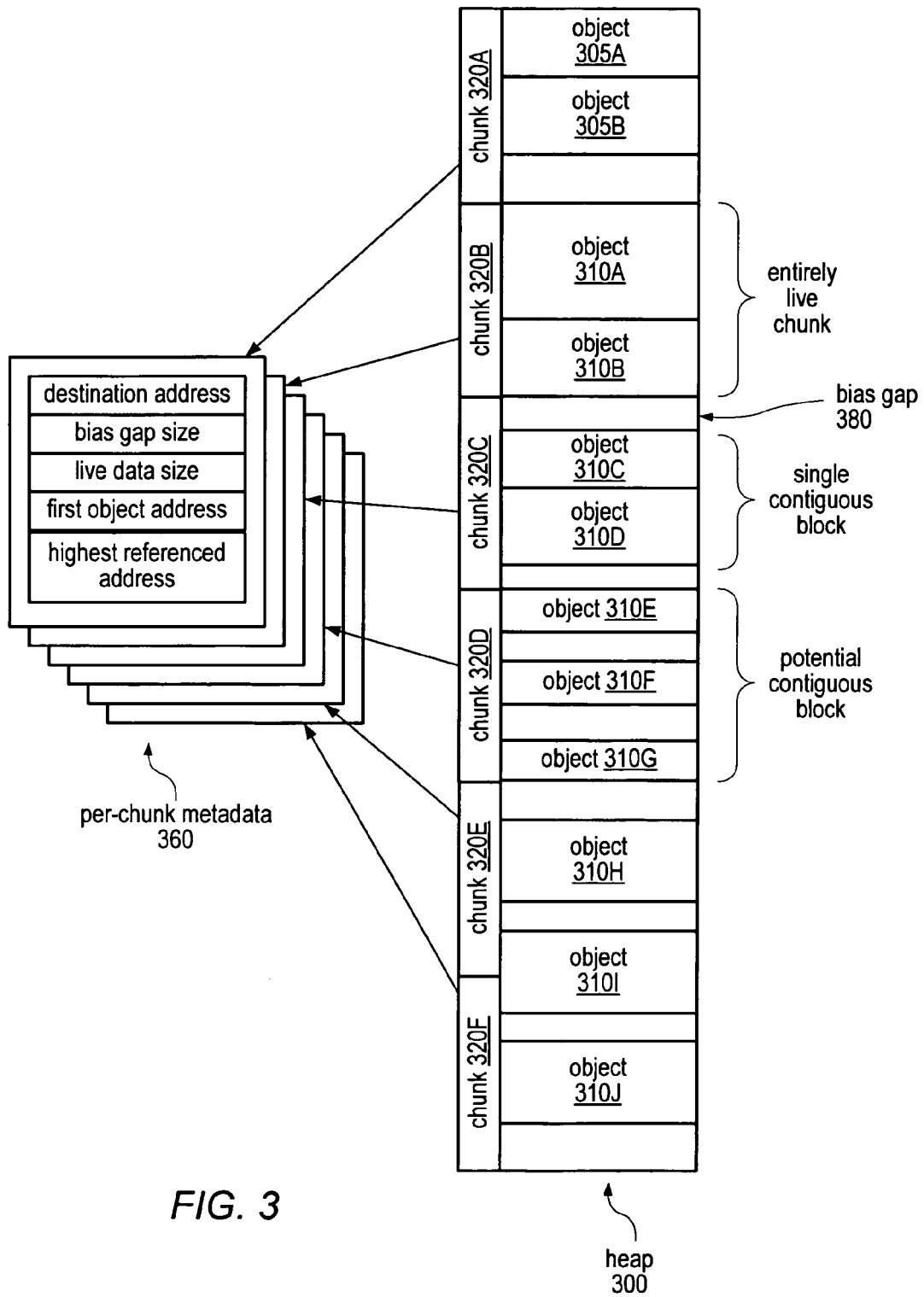
FIG. 3 is a block diagram illustrating a heap and metadata in various stages of sliding compaction, according to one embodiment.

FIG. 3 is a block diagram illustrating a heap and the per-chunk metadata associated with individual chunks of the heap as part of sliding compaction, according to one embodiment. As illustrated in FIG. 3, a heap compactor may record and maintain various pieces of information in per-chunk metadata for heap chunks, according to various embodiments. For example, per-chunk metadata 360 illustrates per-chunk metadata including a destination address, a bias gap size, a live data size, a first object address, and a highest referenced address (HRA) for each heap chunk, according to one embodiment. Please note that different data and different amounts of data may be stored and maintained in per-chunk metadata in different embodiments. The specific per-chunk metadata illustrated in FIG. 3 represents only one possible implementation according to one embodiment. Other embodiments may include different, additional, or fewer instances and types of per-chunk metadata. Additionally, per-chunk metadata may be stored in any of various ways, according to different embodiments.

As described above, heap compactor 220 may, when determining post-compaction destination addresses for reachable objects in a heap, determine whether an individual chunk of the heap contains only contiguous reachable memory and thus has no gaps, such as chunk 320B in FIG. 3. When determining whether a chunk is entirely live, heap compactor 220 may be configured to compare the amount of live data in the chunk with the actual size of the chunk, as will be discussed in more detail below. When objects span chunk boundaries, heap compactor 220 may use the chunk address boundaries instead of either or both the start of the first object and/or the end of the last object in the chunk to ensure that only live data within the chunk is analyzed. Thus, heap compactor 220 may, in one embodiment, determine that chunk 320B is an entirely live chunk, as illustrated in FIG. 3.

In some embodiments, heap compactor 220 may be configured to record an indication that a chunk is entirely live (i.e. that the chunk includes only reachable objects arranged contiguously with no gaps) in the per-chunk metadata for the chunk. For example, in one embodiment, heap compactor 220 may be configured to modify the destination address in chunk 320B's per-chunk metadata to reflect that chunk 320B is entirely live. In some embodiments, heap compactor 220 may be configured to set (to 1) the lowest bit in the destination address as an indication that the chunk is entirely live. Please note that since, in most systems, memory objects, and thus the logical chunks, may be aligned on at least a word basis, no address may ever be odd. Hence, in some embodiments, the lowest bit in a chunk's destination address may be set (to 1) as an indication that the chunk is entirely live. In other embodiments, however, heap compactor 220 may record an indication of whether or not a chunk is entirely live is different manners, such as be using a separate, distinct datum or flag, not part of the destination address of the chunk. However, in some embodiments, using the lowest bit of a chunk's destination address may be more efficient in terms of memory overhead than storing such an indication separately.

Additionally, heap compactor 220 may also determine whether a chunk that is not entirely live (i.e. not containing a single contiguous block of reachable objects entirely filling the chunk) contains a single contiguous block of reachable objects. For example, a chunk may include a block of contiguous reachable objects, but a gap may exist either at the start of the chunk before the first reachable object or after the end of the last reachable object, or both. A gap of dead memory at the start of a chunk before a block of contiguous objects may be referred to herein as a bias gap, such as bias gap 380 between the start of chunk 320C and the start of object 310C. In some embodiments, the size of such a bias gap may be taken into account when determining the post-compaction address for the start of the chunk or when determining the post-compaction address for the start of the first reachable object in the chunk.

When determining whether a chunk includes a single, contiguous block of reachable objects, heap compactor 220 may be configured to compare the amount of live data in the chunk, as determined previously, with the amount of heap memory between the start of the first object and the end of the last object in the chunk. For example, heap compactor 220 may, in one embodiment, compare the amount of memory between the first word of object 310C and the last word of object 310D, including any potential gaps, with the total amount of live data determined previously for chunk 320C. Thus, if there was a gap between object 310C and object 310D the amount of data between the start of object 310C and the end of 310D would be greater than the actual amount of live data for chunk 320C. In one embodiment, heap compactor 220 may analyze chunk 320D by comparing the amount of the heap spanned between the start of object 310E and the end of object 310G with the actual amount of live data in chunk 320D. As illustrated in FIG. 3, chunk 320D includes a gap between object 310E and object 310F and another gap between object 310F and object 310G. Thus, heap compactor 220 may determine that the amount of data between the start of object 310E and the end of object 310G is greater than the actual amount of live data in chunk 320D, as determined previously be traversing all reachable objects in heap 300. Thus, heap compactor 220 may determine that chunk 320D does not include a single contiguous chunk of reachable objects.

In situations where objects span chunk boundaries, heap compactor 220 may be configured to use one or both of the chunk's boundary addresses instead of the address of the edge of the objects when determining whether a chunk includes a single contiguous block of reachable objects. For example, since object 310I starts in chunk 320E but ends in chunk 320F, heap compactor 220 may be configured to compare the amount of data between the start of object 310H and the end of chunk 320E, rather than the end of object 310I, to the actual amount of live data in chunk 320E. Similarly, when analyzing chunk 320F, heap compactor 220 may be configured to compare the amount of data between the start of chunk 320F, rather than the start of object 310I, and the end of object 310J, with the actual amount of live data in chunk 320F. Furthermore, when analyzing a chunk in which the first object in the chunk starts in the previous chunk and the last object ends in the next chunk, heap compactor 220 may be configured to compare the amount of the heap spanned between the start and end of the chunk (i.e. the size of the chunk) and the actual amount of live data in the chunk. In any of the above comparisons, if the amount of data between the start of the first object (or the start of the chunk if the first object starts in the previous chunk) and the end of the last object (or the end of the chunk if the last object ends in the next chunk) equals the amount of live data in the chunk, the objects in the chunk may be considered arranged in a single, contiguous block. If, however, the amount of data between the start of the first object or memory location in the chunk and the end of the last object or memory location in the same chunk is greater than the amount of live data in the chunk, at least one gap exists between two of the objects. Please note that the amount of the heap spanned between the reachable objects in a chunk should never be less than the amount live data in the chunk, according to some embodiments.

Thus, the calculation used, according to some embodiments, to determine whether a chunk includes a single contiguous block of objects may be expressed as:

$$\text{object\_span} = \min(\text{max\_chunk\_address}, \text{end\_of\_last\_object}) - \max(\text{min\_chunk\_address}, \text{start\_of\_first\_object});$$

where object_span refers to the amount of the heap spanned between the start of the first object in the chunk or the start of the chunk whichever is greater and the end of the last object in the chunk or the end of the chunk whichever is smaller. If object_span is equals the actual amount of live data in the chunk, the chunk includes a single, contiguous block of objects.

Please note that while the above calculations used to determine whether a chunk includes a single contiguous block of reachable objects is described in terms of compacting the heap to lower heap addresses, in some embodiments, a heap may be compacted to higher heap addresses with only minor modifications to the above calculations.

In some embodiments, heap compactor 220 may be configured to store an indication that a chunk includes a single contiguous block of objects in the chunk's per-chunk metadata, such as in per-chunk metadata 360. As noted above, in one embodiment heap compactor 220 may be configured to use the lowest bit of a chunk's destination address to indicate whether or not the chunk is entirely live. In other embodiments, however, heap compactor 220 may be configured to use the lowest bit in a chunk's destination address to indication whether the chunk includes a single, contiguous block of objects, regardless of whether that block of contiguous objects fills the entire chunk or not. Additionally, heap compactor 220 may be configured to store the size of any bias gap, such as bias gap 380 in chunk 320C, in a chunk's per-chunk metadata. The size of the bias gap may be subtracted from the destination address stored in the per-chunk data or alternatively may be stored separately in the per-chunk data for access and use subsequently, according to various embodiments. As noted above, a bias gap may refer to the offset of the start of the first reachable object in relation to the start of the chunk including that object.

According to some embodiments, heap compactor 220 may be configured to use a single calculation, such as the one described above, to determine whether a chunk includes a single, contiguous block of objects and whether the chunk is entirely live. For example, if heap compactor 220 determines that a chunk includes a single contiguous block of objects, heap compactor 220 may also be configured to compare the amount of memory spanned by that block of objects to the size of the chunk and thus determine whether the chunk is entirely live. In other embodiments, however, heap compactor 220 may be configured to determine whether a chunk includes a single, contiguous block of objects separately from determining whether the chunk is entirely live.

In situations where a chunk does not include a single, contiguous block of reachable objects, heap compactor 220 may be configure to create a contiguous block of reachable objects by filling gaps between objects in a chunk, according to some embodiments. For example, in some embodiments, heap compactor 220 may be configured to create deadwood objects in gaps between objects by writing an object header into the start of the gap and configuring the gap to be a dead object of equal size to the gap. For example, in one embodiment, heap compactor 220 may be configured to overwrite the first few words at the start of the gap to represent a non-reference-bearing object. Thus, heap compactor 220 may create one or more deadwood objects of appropriate size to fill gaps between objects 310E, 310F, and 310G in order to completely fill the gaps and create a single, contiguous block of reachable object in chunk 320D. In one embodiment, heap compactor 220 may configure deadwood objects as integer array objects because an integer array object may be created to match the size of any gap. Please note that such a deadwood object may not be an actual object, but instead, may simply be a placeholder object header specifying an object size appropriate for the gap being filled.

If, according to certain embodiments, heap compactor 220 creates a single, contiguous block of objects in a chunk by creating deadwood objects in gaps between objects in the chunk, heap compactor 220 may be configured to store in the chunk's per-chunk metadata an indication that the chunk now includes a single contiguous block of objects, as described above. Additionally, if by adding objects in gaps between objects in a chunk, heap compactor 220 makes the chunk entirely live, heap compactor 220 may, in some embodiments, be configured to store an indication that the chunk is entirely live in the chunk's per-chunk metadata, also as described above.

In some embodiments, the heap compactor may be configured to apply compaction policies when determining whether to create a contiguous block of reachable objects by filling gaps between the objects. For example, in one embodiment, the heap compactor may be configured to determine whether the amount of time/effort required to fill the gaps is less than the amount of time/effort saved in determining post-compaction destination address for the objects individually. Thus, heap compactor 220 may be configured to analyze a chunk to determine whether it contains a potential contiguous block of objects, as illustrated in FIG. 3. If, according to one embodiment, the heap compactor estimates that the amount of time/effort required to create a contiguous block of objects out of a potential contiguous block is close to or more that the amount of time/effort such a contiguous block would save when calculating destination addresses, the heap compactor may be configured to not fill the gaps and, instead, calculate the post-compaction destination for each reachable object individually. Alternatively, in other embodiments, the heap compactor may be configured to determine whether to create a contiguous block of objects based on the size or number of the individual gaps between the objects. In general, various methods may be used to determine whether or not to create a single contiguous block of reachable objects, according to various embodiments.

As described above, a heap compactor may be configured to update object references as part of sliding compaction, as described herein. In some embodiments, the heap compactor may be configured to determine the post-compaction destination address for every object before beginning to update references in the heap. However, in other embodiments, the information necessary to determine the post-compaction destination address for every object, such as the total amount of live data below each chunk, the offset within each chunk of the first reachable object and whether or not each chunk is entirely live or contains a single contiguous block of reachable objects, and each object's post-compaction destination address may be determined only when needed.

In some embodiments, a heap compactor may be configured to maintain HRA values associated with each chunk of the heap, such as in per-chunk metadata 360, described above. When updating object references, a heap compactor may be configured to first check an HRA value for a chunk of the heap to determine whether or not the object references in that particular heap chunk should be updated, according to some embodiments. For instance, in one embodiment, heap compactor 220 may be configured to step through each chunk of the heap comparing each chunk's respective HRA value to an address representing the lowest (in terms of heap address order) object to be relocated during compaction. If the HRA value for a particular chunk indicates that at least one reference in the chunk points to an object that may be relocated during compaction, heap compactor 220 may be configured to update all the object references within that chunk, according to one embodiment. If a chunk's HRA value indicates at least one reference within the chunk requires updating, heap compactor 220 may be configured to analyze all the object references within that respective chunk to determine which object references should be updated. In other words, in some embodiments, a heap compactor may update all object references in a heap chunk whose HRA value represents an address within a region of the heap to be relocated during compaction, while in other embodiments, a heap compactor may use a chunk's HRA value to determine whether or not to examine the individual object references with that chunk to determine exactly which object references should be updated. Thus, the trade-off between examining each individual reference to only update those that specifically point to a relocated object and updating all the references in a particular chunk may vary from embodiment to embodiment.

In one embodiment, a heap compactor may update all object references before actually compacting the objects in the heap. In one embodiment, only references to the start of an object may be updated, while, in other embodiments, references to any reachable memory location may be updated, such as an internal reference to a memory location within an object. However, as described above, a heap compactor may only update references in chunks whose respective HRA values indicate object references that require updating. Thus, in some embodiments, a chunk's HRA value may indicate that an internal reference needs to be updated, since the objects in the chunk itself may be relocated during compaction.

When implementing sliding compaction as described above, a heap compactor may treat blocks of contiguous reachable objects a single unit. For example, since heap compactor 220 may have already determined and stored a post-compaction destination address for the first reachable object or memory location in each chunk based upon the amount of live data in lower chunks, as described above, heap compactor 220 may determine the post-compaction destination for objects arranged contiguously by adding the offset of an object from the start of the first reachable object or memory location in the contiguous block to the destination address for the first object or memory location, such as may be stored in the chunk's per-chunk metadata.

In some embodiments, heap compactor 220 may be configured to update all object references serially, while in other embodiments, heap compactor 220 may utilize two or more compactor threads 225 to update object references in parallel. For instance, each compactor thread may update the object references in individual chunks and the compactor threads may coordinate, via any of various well-known thread synchronization techniques, to ensure that two compactor threads do not attempt to update the references in the same chunk. For example, the various threads of a heap compactor may utilize thread synchronization, such by using a blocking semaphore in one embodiment, when accessing per-chunk metadata, such as when examining a chunk's respective HRA value. As numerous thread synchronization techniques are well known in the art, they will not be discussed in detail herein.

Figure 4:
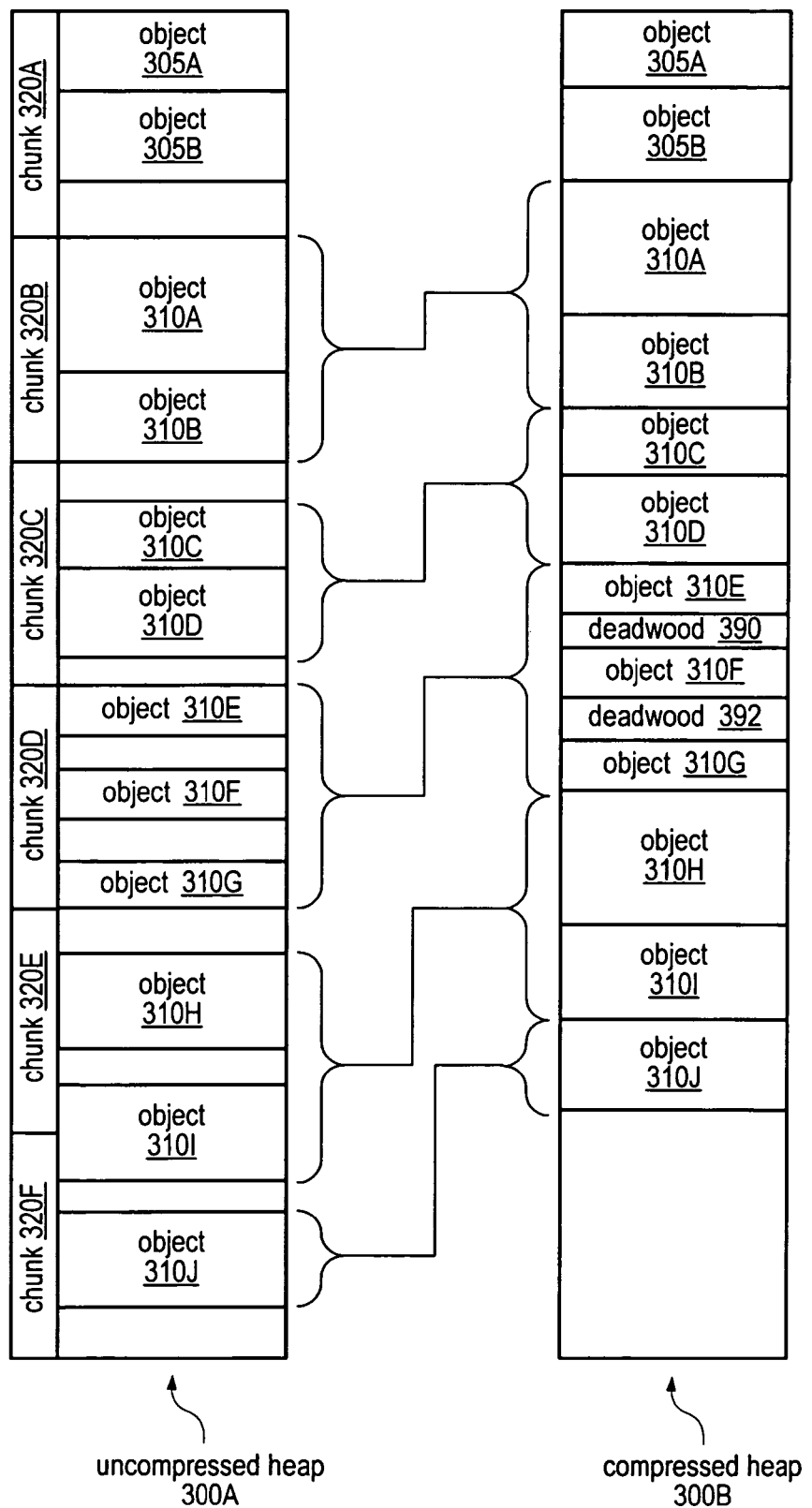
FIG. 4 is a block diagram logically illustrating sliding compaction, according to one embodiment.

FIG. 4 is a block diagram illustrating the logical arrangement of a heap both before and after compaction, according to one embodiment. As described above, heap compactor 220 may be configured to determine post-compaction destination addresses for objects in a chunk, such as objects 310A and 310B in chunk 320B, in some embodiments by combining the offset of objects in relation to the first live memory location of the chunk or in relation to the start of the first live object in the chunk. For example, during the marking phase of sliding compaction, heap compactor 220 may determine that chunk 320B is entirely live because objects 310A and 310B completely fill the chunk with no gaps. Thus, when sliding objects 310A and 310B during the sliding phase of sliding compaction, heap compactor 220 may determine the post-compaction destination addresses for objects 310A and 310B based upon adding the respective offset of the first word of each object to the destination address from the per-chunk metadata for chunk 320B. Thus, in compressed heap 300B object 310B is located in the same location with respect to object 310A. In other words, object 310B was compacted (or slid) to a destination determined relative to the destination of object 310A. Similarly, any references to object 310B would be updated to include the post-compaction destination address of object 310B based upon its offset from the post-compaction destination address for object 310A.

Also as noted above, heap compactor 220 may be configured to determine whether a chunk includes a single, contiguous block of objects, such as formed by objects 310C and 310D in chunk 320C. Thus, when determining post-compaction destination addresses for objects 310C and 310D, heap compactor 220 maybe configured to combine the respective offset of the start of each object with the destination address in the per-chunk metadata for chunk 320C. Additionally, heap compactor 220 may be configured to create deadwoods objects 390 and 392 to fill the gaps between objects 310E, 310F and 310G, as illustrated in FIG. 4 and described above.

Also as noted above, heap compactor 220 may be configured to calculate or otherwise determine HRA values for each heap chunk. In some embodiments, heap compactor 220 may go through the heap updating HRA values for chunks prior to the marking phase. Subsequently, heap compactor 220 may examine the HRA values to determine which chunks' addresses need to be updated. If a chunk's associated HRA value indicates that all the references within that chunk point to address with a dense prefix (or other heap region not being relocated during compaction) heap compactor 220 may not update any references within that chunk.

Figure 5A:
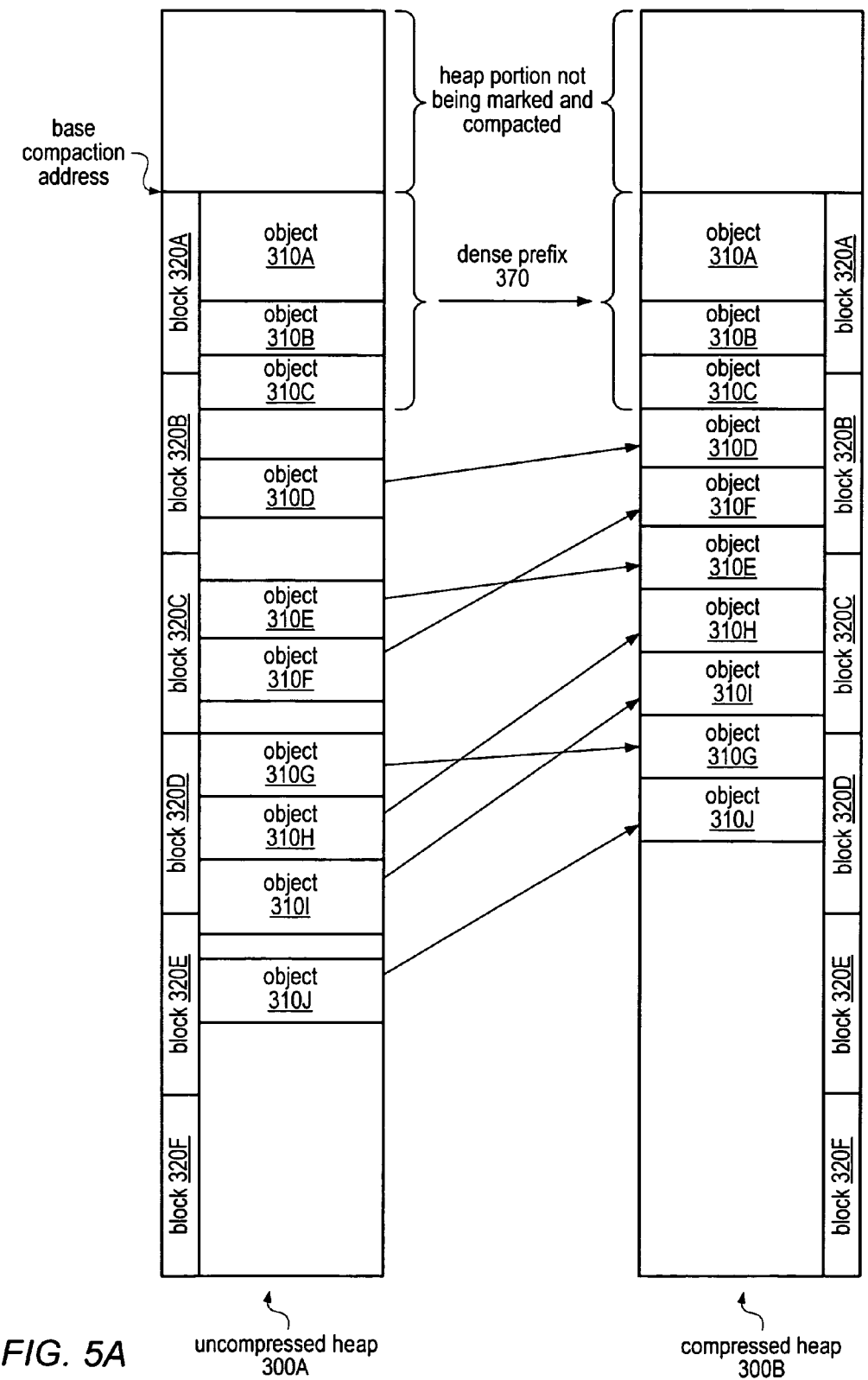
FIG. 5A is a block diagram illustrating the permuting of objects within block groups during sliding compaction, according to one embodiment.

FIG. 5A is a block diagram illustrating a heap 300 both before and after compaction, as described herein. As noted above, a heap may include a dense prefix that includes objects that are either already fully compacted, or that are within some threshold of being fully compacted, such as dense prefix 370. The objects within dense prefix 370 may not be relocated during compaction, as illustrated by their relative locations in both uncompressed heap 300A and compressed heap 300B. The objects within dense prefix 370 may be ignored except to update any references to objects outside dense prefix 370. Since the objects within dense prefix 370 may not be relocated during compaction, any references to those objects may not be updated during the marking or compaction phases (esp. in embodiments where the dense prefix is identified before the start of marking) of sliding compaction, according to some embodiments. As noted above, a heap compactor may use HRA information to determine whether or not object references in the heap point to objects being relocated and thus, whether or not those object references require updating during compaction. Additionally, the objects in dense prefix 370 may be treated specially during marking. For example, in one embodiment, per-chunk object information may not be determined for any objects in chunks that reside completely within a dense prefix. However, per-chunk total live counts may be determined for chunks within the dense prefix so that proper total live counts may be determined for later chunks, in some embodiments.

When determining a dense prefix, a heap compactor, such as heap compactor 220, may be configured to take into account the HRA information for a chunk. For instance, a heap compactor may be configured to determine a dense prefix so as to minimize the number of references within the dense prefix that need to be updated during compaction, according to some embodiments. For example, a heap compactor may designate a dense prefix so as to ensure that no references of chunks located in the dense preference reference chunks that will be relocated during compaction. Subsequently, during compaction, the heap compactor may be able to not examine (or update) any references within the dense prefix, thereby possibly increasing the overall efficiency (in terms of execution time) of the compaction.

Figure 5B:
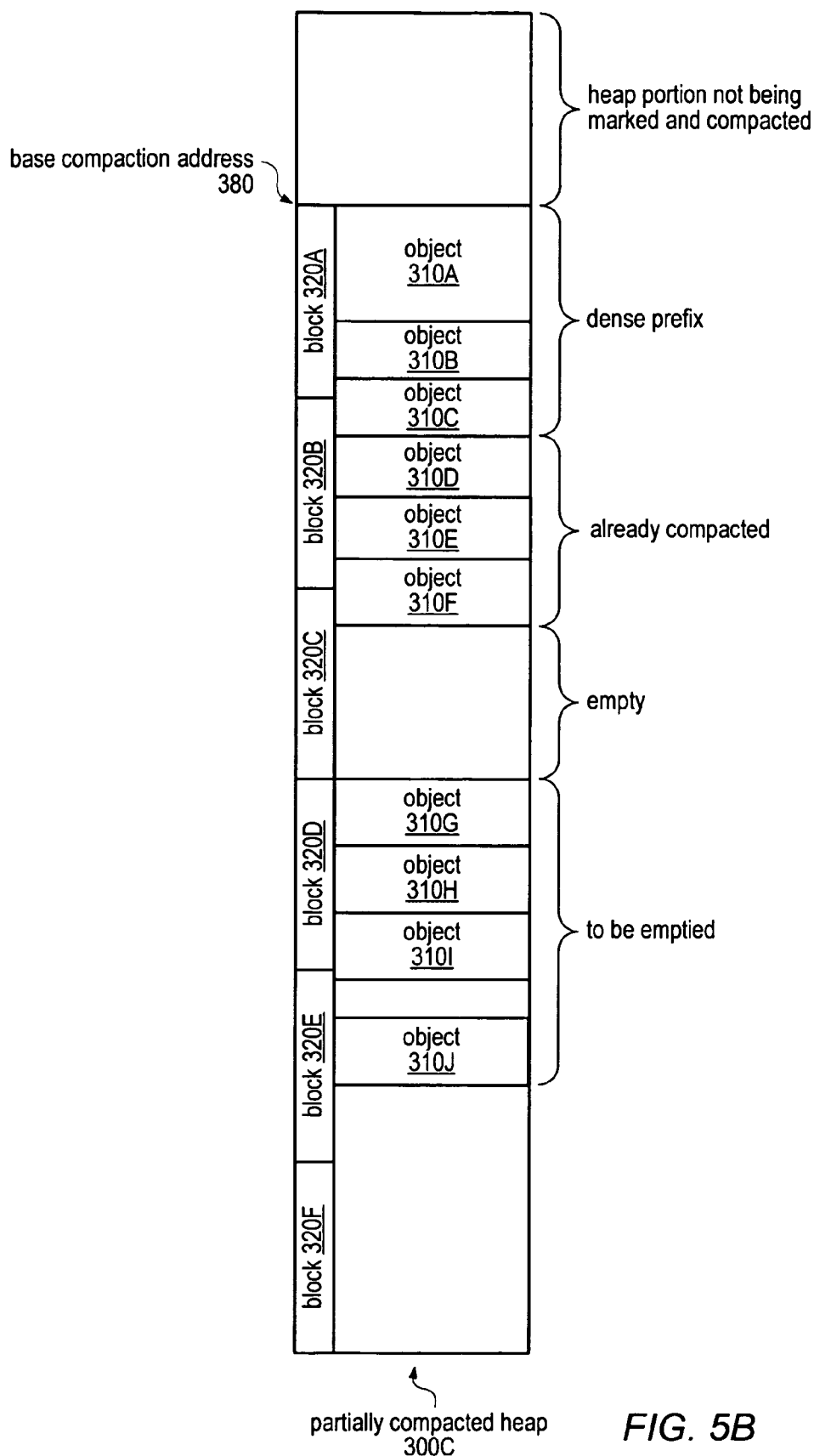
FIG. 5B is a block diagram a partially compacted heap sliding compaction, according to one embodiment.

During compaction, the heap may be logically divided into four sets of chunks: a dense prefix of chunks, chunks that are already compacted, empty (or partially empty) chunks and chunks to be emptied, as illustrated in FIG. 5B. Please note that in some embodiments, at least one chunk may be partially empty because an object may have been relocated that spans into the chunk, but the remainder of the chunk may be empty, such as block 320C in FIG. 5B. FIG. 5B is a block diagram illustrating a partially compacted heap 300C. In some embodiments, each of multiple compacting threads may claim a chunk to empty from the chunks to be emptied, with no chunk being emptied until the destination ranges for the objects in the claimed chunk are empty. In other words, a thread may claim a chunk out of the chunks remaining to be emptied as long as the destination addresses for reachable data in the chunk are in the same chunk or in chunks that are already empty. In general, those chunks whose destination addresses are lower than any chunk currently being emptied are available for claiming and emptying by a thread, in those embodiments where threads claim chunk to empty. Please note, that an object that is fully within a chunk before compaction may be relocated to a destination location that causes it to span two destination chunks after compaction, according to some embodiments.

In other embodiments, however, threads may claim chunks to fill, rather than chunks to empty. For instance, a thread may claim an empty, or partially empty, chunk and then relocate objects into that chunk. For example, in one embodiment, a mark-compactor thread 225 may claim block 320C in FIG. 5B and move objects from block 320D into block 320C. In some embodiments, the thread may determine which object to move into the chunk from the chunk's per-chunk information. For example, in embodiments where threads claim chunk to fill, additional per-chunk information may be gathered or recorded regarding which objects are to be relocated into chunks. For example, in one embodiment, after the marking phase, while adding up the total amount of live memory in each chunk, heap compactor 220 may also determine and store information regarding those objects that are to be relocated into a chunk in the chunk's per-chunk information, such as by storing an index or address identifying the source chunk or chunks from which the objects are to be relocated. Thus, during compaction, a thread may claim a chunk to fill and then access that chunk's per-chunk information to determine which objects to relocate into it, according to one embodiment.

In some embodiments, as described above, multiple compactor threads may work in parallel to compact and update the chunks of a heap during compaction. In some embodiments, a thread may first check to see whether or not all the chunks up to the chunk indicated by a particular chunk's HRA have been completely updated before updating the references in the particular chunk, when the heap is being compacted toward lower heap addresses. Similarly, when the heap is being compacted toward higher heap addresses, a thread may chuck to see whether or not all the chunks above the chunk indicated by a particular chunk's LRA have been completely updated before updating the references in the particular chunk. Additionally, when a heap is being compacted toward the middle of the heap, a thread may check to see whether or not all the references in chunks between the two chunks indicated by a particular chunk's LRA and HRA have been updated before updating the references of the particular chunk. In other words, if there is a possibility that the objects referenced by a particular chunk have not been updated, a heap compactor thread may not update that particular chunk. In some embodiments, the thread may put such a chunk on a deferred list to be updated later once all the chunks below the deferred chunk's HRA (or above the chunk's LRA) value have been updated. A chunk's range-edge reference address(es), such as its LRA and/or HRA, therefore indicates a range, namely the range between the range-edge reference address and the portion of the heap already compacted.

As objects are relocated, the object references in those objects may be updated as well. As noted above, HRA information may be utilized to determine whether object references in a particular region of the heap require updating. In some embodiments, all object references may be half-updated to hold the referenced object's chunk offset (i.e. its offset from the first post-compaction address for the chunk). During compaction, those object references are updated to refer to the referenced object's final address in the compacted heap. The offset value in the lower order bits of an object reference may be combined with the destination address for the referenced object's chunk to determine the referenced object's post-compaction address within the heap. For example, in some embodiments, the lower order bits of an object reference may be added to the destination address for the reference to determine the referenced object's post-compaction address. In other embodiments however, determining a referenced object's post-compaction address may involve more than just adding the lower order bits of an object reference to the destination address for the reference, such as when the referenced object may be larger than a single chunk and/or spans chunk boundaries.

Thus, during compaction, the objects in each chunk are moved to their post-compaction locations as determined by their respective offset within their chunk and the chunk's post-compaction location. As described above, the post-compaction address of a chunk's first object (the object encountered first during marking) may be determined by the total amount of live data residing at lower addresses in the heap (plus the size of any portion of the heap not being compacted). Thus, as illustrated by FIG. 5A, the post-compaction address for block 320C corresponds to the total amount size of all the reachable objects located at lower heap addresses than block 320C, according to one embodiment. Similarly, objects 320E and 310F may be located in compacted heap 300B right after all objects located at lower addresses and each may located in relation to each other according to how their respective block offsets where determined during marking. Using the information collected and recording during the marking phase (including HRA information), multiple mark-compactor threads 225 may relocate, or compact, each reachable object independently of the others.

Additionally, HRA values for chunks may be updated after objects are moved to their respective post-compaction locations, according to some embodiments. In some embodiments, as chunks are processed during compaction, HRA values for destination chunks (into which objects are being compacted) may be updated or merged with the HRA values for the chunks from which the objects are being moved. For example, if objects from two source chunks are moved into a single destination chunk, the HRA value for the destination chunk may be set to indicate the higher of the HRA values for the two source chunks, according to one embodiment.

Please note, that in some embodiments, an object may be larger than a single chunk and thus, may span two or more chunks. When an object that spans more than one chunk is relocated, the object may be moved either by a single mark-compactor thread or may be relocated in pieces by multiple threads, according to various embodiments. In embodiments where multiple threads may each move a portion of a large object (that spans two or more chunks), additional per-chunk information may be gathered and maintained regarding that object, as described above.

Additionally, object references in each object may be updated to include the address of the referenced object's post-compaction destination in compressed heap 300B. As noted above, at the start the compaction phase, all object references include the chunk offset of the referenced object and may also include an indication of the referenced object's chunk. Thus, in some embodiments, a mark-compactor thread 225 may combine the referenced object's chunk offset with the chunk's post-compaction location (i.e. the post-compaction address for the first relocated object or memory location in the chunk) to determine the referenced object's actual post-compaction location in compressed heap 300B. The thread may then overwrite the object reference to make a full and complete reference to the object in the compressed heap, according to some embodiments.

Figure 6:
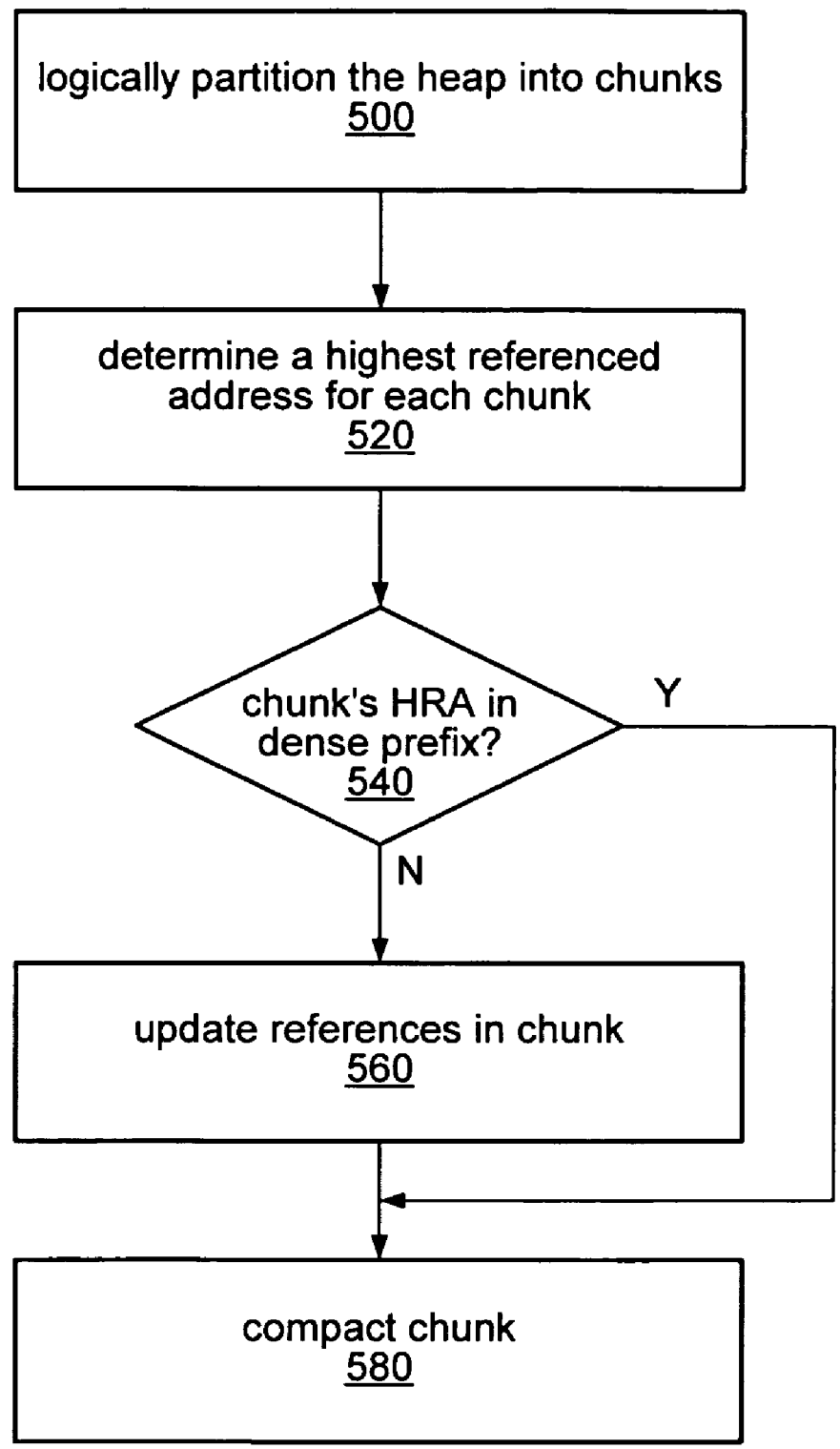
FIG. 6 is a flowchart illustrating one embodiment of a method for sliding compaction garbage collection using HRA information.

FIG. 6 is a flowchart illustrating one embodiment of a method for sliding compaction garbage collection using HRA values, as described herein. As described above, references to objects in the heap may be updated, as part of heap compaction, to point to the referenced object's post-compaction destination address, according to some embodiments. A heap compactor, such as heap compactor 220, may first logically partition the heap into fixed size chunks, as illustrated by block 500. The actual size of each chunk may vary from embodiment to embodiment. For example, in one embodiment heap compactor 200 may divide the heap into 4K sized chunks, while in other embodiments heap compactor 200 may partition the heap into smaller (e.g., 256-byte, 512-byte, 1KB, or 2K) chunks or larger (e.g., 8K) chunks.

After partitioning the heap into fixed sized chunks, heap compactor 220 may determine the highest referenced address (HRA) for each chunk, as illustrated by block 520. In some embodiments, heap compactor 220 may determine HRA for all chunks at one time as part of heap compaction, such as prior to the marking phase of compaction. For example, a heap compactor may iterate over each heap chunk in turn examining each object reference in each chunk determining the HRA for each respective chunk. In other embodiments, heap compactor 220 may be configured to maintain and update HRAs between heap compactions, such as by updating HRAs whenever memory is updated. In some embodiments, HRAs may be stored with other per-chunk metadata in a data structure separate from the memory in the chunk itself. In other embodiments, however, HRA values may be stored in the heap chunk itself, such as in a header portion of each chunk. In yet other embodiments, chunk HRA values may be stored in a separate data structure holding just the HRA values and associating each HRA value with a respective chunk. In general any suitable method and manner of maintaining HRA values and associating them with respective heap chunks may be utilized, according to different embodiments.

Please note, while not specifically illustrated in FIG. 6, heap compactor 220 may be configured to determine post compaction addresses for objects and/or chunks be relocated during compaction. In some embodiments, heap compactor 220 may be configured to trace through the heap determining post compaction addresses for each object, or at least those objects being relocated during compaction. As described herein, post compaction address may be calculated or determined in various ways, according to different embodiments.

For instance, in some embodiments, heap compactor 220 may add up a combined total size of all live or reachable objects in the heap lower than (i.e. located at lower addresses than) a chunk and use that total size to determine the post-compaction address or location in the heap for the chunk. For example, as illustrated in FIG. 3, discussed above, the post-compaction destination address for chunk 320B may be based upon the total size of objects 305A and 305B in chunk 320A. The post-compaction address or destination address for the chunk may, in some embodiments, represent the location in the compacted heap of the first word of the first live object in that chunk. Thus, heap compactor 220 may, in some embodiments, traverse through the heap chunk-by-chunk summing up the sizes for all live, or reachable, objects. Additionally, the amount of live data (i.e. combined size of reachable object) in each chunk may be saved in the per-chunk metadata for each chunk, as described above.

In some embodiments, multiple compactor threads 225 may perform this summing, and thus the determining of post-compaction destination addresses for each chunk, in parallel, using any of various synchronization techniques to ensure that no two threads work on the same chunk at the same time. For example, each compactor thread may claim the next available chunk in heap address order and add up the total amount of live data (i.e. the combined size of all reachable objects) in that chunk, recording the amount of live data in the chunk's per-chunk metadata.

The post-compaction destination address for each chunk may be saved or stored in per-chunk metadata for each chunk, such as in per-chunk metadata 360. In other embodiments, the post-compaction destination address for a chunk may be stored or saved in a different location or manner, however. In general, any method of recording the address may be used as part of address calculations, as described herein. When performing sliding compaction a heap compactor may determine the post-compaction destination address for each reachable object in the heap. Alternatively, in some embodiments, post-compaction destination addresses may also be determined for memory locations within an object. A heap compactor may also determine if any chunks include a single block of contiguous objects. As described above, the post-compaction destination address for any object in a block of contiguous reachable objects may be determined based upon that object's offset in relation to the first object in the chunk, according to some embodiments. Since, sliding compaction techniques maintain the same order of objects across compaction, the ordering of the object in a contiguous block may be preserved during compaction. Thus, once a heap compactor has determined the post-compaction destination address for a chunk, as described above, the post-compaction destination address for any objects in a single, contiguous block of objects in that chunk may be determined by adding their offset relative address offset within that chunk to the post-compaction destination address for the chunk.

In some embodiments, heap compactor 220 may tag, mark or otherwise record an indication that a chunk includes a single contiguous chunk of reachable objects, as described above. For example, in one embodiment, heap compactor 220 may set the lowest order bit in the post-compaction destination address for the chunk in the chunk's per-chunk metadata. Since most, if not all, memory management systems align memory objects on at least a word boundary (i.e. no objects may start at an odd address) the lowest order bit of any valid post-compaction destination address may always be zero. Thus, in one embodiment, heap compactor 220 may utilize that fact to re-use the lowest bit of the post-compaction destination address to indicate whether or not a chunk includes a single, contiguous chunk of reachable objects. In other embodiments, however heap compactor 220 may record or indicate that a chunk includes a single, contiguous chunk of reachable objects in other ways, such as by using a separate data location or flag in the pre-chunk metadata.

As will be discussed in more detail below, a chunk may be completely filled by a single, contiguous chunk of reachable objects or may also include a gap, such as either unallocated memory or deallocated, or unreachable, objects, before and/or after a single chunk of reachable objects. When such a gap occurs before the start of a chunk of contiguous reachable objects, heap compactor 220 may, in one embodiment, record the size of that gap, referred to as a bias gap herein, in the chunk's per-chunk metadata. Additionally, heap compactor 220 may also be configured to create a single contiguous chunk of reachable objects by creating deadwood objects of suitable size to fill gaps between objects in a chunk.

As when determining the post-compaction destination addresses for each chunk, multiple compactor threads may determine and tag chunks that include a single contiguous chunk of reachable objects in parallel, according to some embodiments. In one embodiment, heap compactor 220 and/or multiple compactor threads 225 may determine whether a chunk includes a single chunk of contiguous reachable objects at the same time as determining the post-compaction destination address for each chunk.

As part of heap compaction, heap compactor 220 may be configured to examine a chunk's HRA value to verify whether or not the HRA falls within a dense prefix of the heap, as indicated by block 540. As noted above, a dense prefix may be a region of the heap that will not be compacted or otherwise relocated during compaction. If a chunk's HRA indicates a memory address within a dense prefix, none of the object references within the chunk require updating because the objects to which those references point are all within the dense prefix and thus, may not be relocated during compaction. In some embodiments, HRA values are stored as actual memory addresses and so a simple comparison of an HRA value to the highest memory address included within a dense prefix may be all that is required to determine whether or not to update the references within that chunk. In other embodiments, HRA values may be stored in other manners, requiring different or more complicated comparison to determine whether an HRA falls within a dense prefix. For example, in one embodiment, rather than maintaining HRA values as actual memory addresses, HRA values may be stored as indicators of particular heap chunks. Using chunk identifiers as HRA values may, in one embodiment, require smaller values and thus may reduce the overall memory overhead required for heap compaction.

If a chunk's HRA falls within a dense prefix or other region not being relocated during compaction, as indicated by the positive output of decision block 540, heap compactor 220 may not update any references within that particular chunk. If, however, a chunk's HRA does not fall within a dense prefix, as indicated by the negative output from decision block 540, heap compactor 220 may be configured to update the object references within that chunk, as indicated by block 560. As noted above, in one embodiment, heap compactor 220 may examine and update heap chunks serially, while in other embodiment, multiple compactor threads may update chunks in parallel. Thus, a compactor thread may first claim a particular chunk to update, examine the chunk's HRA to determine whether or not to update references with in the chunk and, if indicated by the HRA, update the references in the chunk.

In one embodiment, a heap compactor, or compactor thread, may examine each object reference in a chunk and determine on a reference-by-reference basis whether or not to update each particular reference. For example, a chunk may contain multiple object references, and while the chunk's HRA may indicate that at least one of the references requires updating, other references in the chunk may not require updating. Thus, in some embodiments, a heap compactor (or compactor threads) may be configured to verify each reference individually to determine exactly which references should be updated. In other embodiments, however, a heap compactor may be configured to update all references in a chunk when that chunk's HRA does not fall within a dense prefix or other region not be relocated during compaction. For instance, in some embodiments, it might improve the overall efficiency of the heap compaction process to update extra references in a chunk rather than examining each reference in the chunk to determine exactly which references require updating. In one embodiment, the decision regarding whether to update all the references in a chunk or to examiner all the references to determine exactly which references should be updated may be decided by the heap compactor, or the compactor thread, at run time, such as based on the number of references in the chunk, for example. In general, however, when a chunk's HRA does not fall within a dense prefix heap compactor 220 and/or multiple heap threads working in parallel, may be configured to update at least the references in a chunk that point to objects that may be relocated during compaction.

Any reference to an object that is part of a contiguous block of reachable objects may be updated by adding the offset of the object in relation to the first object or memory location in the contiguous block to the post-compaction destination address for the chunk including the block of reachable objects or memory locations, according to one embodiment. Thus, rather than determining a referenced object's post-compaction destination address individually on an object-per-object basis, such as by the use of object-extent bitmaps, breaktables or individual forwarding addresses, heap compactor 220 may, in some embodiments, utilize the object's offset to determine the post-compaction destination addresses for objects arranged contiguously.

Please note that any suitable method for traversing the heap and or object references may be utilized in conjunction with updating references, as described herein. Thus, in some embodiments, heap compactor 220 may traverse the heap updating the references in each chunk as it goes. In other embodiments, however, object references may be updated by traversing the reachable objects in a depth first recursive manner.

After updating all object references (that require updated based on chunk HRA values) to point to the referenced object's destination address, heap compactor 220 may then compact the heap by moving each reachable object to its respective post-compaction destination address, as illustrated by block 580. In some embodiments, multiple compactor threads 225 may compact the heap in parallel by each claiming a chunk and moving the objects in that chunk to their post-compaction destinations. The exact method used to traverse the heap and move the reachable objects to their destinations may vary from embodiment to embodiment. In general, any form of sliding compaction or any form of compaction that preserves the address order of reachable objects may be used with HRA information, as described herein.

Please note that the functionality described above regarding FIG. 6 may be performed in different orders in different embodiments. For instance, in some embodiments, a heap may be logically partitioned into chunks as part of initialization of a heap compactor or memory system and may not be performed directly before determining a highest referenced address for each chunk, as illustrated in FIG. 6. Also, as described above, determining and maintaining HRAs for heap chunks may be performed in any of several different manners, according to various embodiments. For example, in one embodiment, chunks' HRA values may be updated by a memory system every time memory is allocated or updated throughout execution rather than simply during the heap compaction process. Alternatively, in other embodiments, a heap compactor may be configured to examine and update the HRA values for every heap chunk as part of the heap compaction process.

Similarly, the discussion of FIG. 6 above describes determining a chunk's HRA, checking to see if that chunk's HRA is within a dense prefix, possibly updating the references in that chunk and then compacting the chunk, according to one embodiment. However, in other embodiments, the functionality of processing HRAs and chunks may be preformed in a different order. For instance, in one embodiment, a heap compactor may determine HRA values for every chunk before updating the references in any particular chunk. Also, in some embodiments, multiple compactor threads may be configured to update references and compact chunks in parallel. Thus, the functionality described above regarding FIG. 6 may be performed in different orders and manners according to different embodiments, as described herein.

Figure 7:
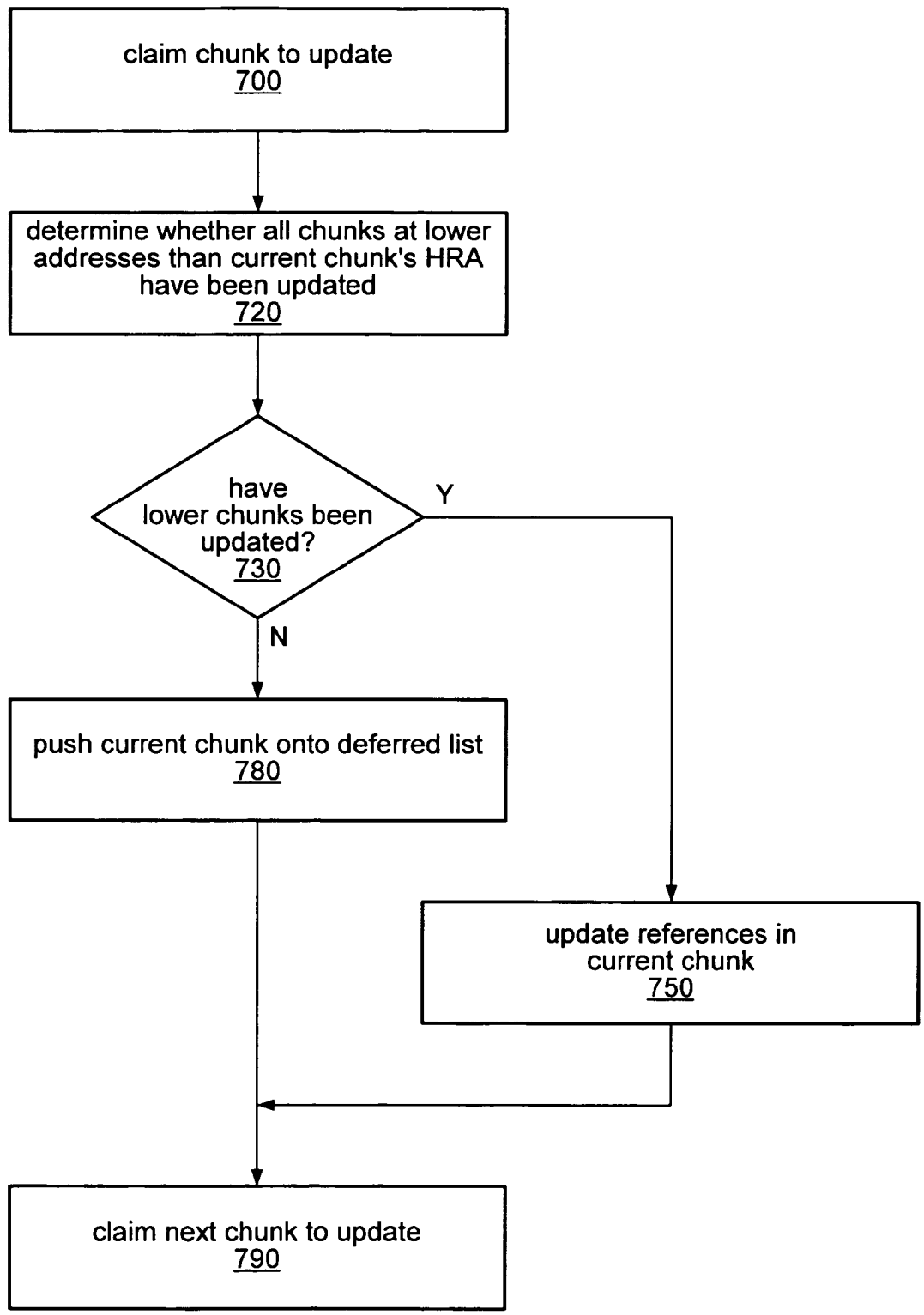
FIG. 7 is a flowchart illustrating one embodiment of a method for determining whether a heap region includes a single contiguous chunk of reachable objects.

While FIG. 6 above, illustrated one embodiment of a method for determining whether to update object references according to chunk HRA values, FIG. 7 is a flowchart illustrating one embodiment of a method for updating object references. After determining or updating HRA values for heap chunks as described above, heap compactor 220, and/or multiple mark-compactor threads 225 may update object references in chunks whose HRAs indicate that the respective chunk includes at least one reference requiring updating, as also described above. A heap compactor thread 225 may claim a chunk to update, as illustrated by block 700. For example, in one embodiment, claiming a chunk to update may involve examining the chunk's HRA to determine whether or not it falls within a dense prefix (or within another region of the heap that will not be relocated during compaction), as described above regarding FIG. 6.

After claiming a chunk to update, such as by determining that the chunk includes at least one references to an object being relocated during compaction, compactor thread 225 may determine whether all the heap chunks at lower addresses that the claimed chunk's HRA have been updated, as indicated by block 720. If, as indicated by the positive output from decision block 730, all the chunk in the heap at lower addresses than the claimed chunk's HRA have been updated, compactor thread 225 may update the references in the claimed chunk, as illustrated by block 750. As described above, when updating references, a compactor thread may be configured to update only those references in the chunk that actually point to objects being relocated during compaction, according to some embodiments. In other embodiments, a compactor thread may be configured to update all references in a chunk if it is determined that the chunk includes at least one references requiring updating, such as may be indicated by the chunk's HRA.

If, as indicated by the negative output of decision block 730, at least one of the chunk s located at lower addresses than the claimed chunk's HRA have not been completely updated, compactor thread 225 may be configured to push the current claimed chunk onto a deferred list of heap chunks, as indicated by block 780, for later processing after all the chunks located at lower addresses than the deferred chunk's HRA have been updated. Chunks may be put on a deferred list in any of a number of different ways, using any of a number of different methods and/or data structures, according to various embodiments. For example, in one embodiment a simple array of chunk identifiers may be used as a deferred list. In other embodiments, linked lists or queues may be utilized. In yet other embodiments, a deferred flag may be set in a chunk's per-chunk metadata to indicate that the chunk is on a deferred list. In some embodiments, only the compactor thread that initially claimed a chunk may subsequently update the references in that chunk. In other embodiments however, any thread may update the references for a chunk previously deferred by another thread. Thus, multiple compactor thread 225 may work in parallel to update the object references in heap chunks, coordinating as required to prevent two threads updating or claiming the same chunk to update. By allowing a thread to defer updating the references in a particular chunk until after all chunks lower (or in general closer to the dense prefix) than the particular chunk's HRA have been updated may allow a heap compactor, or the threads of the heap compactor, to transition from the address-calculation phase to the reference-updating phase without a barrier. In other words, reference updating may begin before address calculation has been completed on all chunks, according to some embodiments.

After either updating the references in a claimed chunk, as illustrated by block 750, or deferring the claimed chunk, as illustrated by block 780, a compactor thread may proceed to claim another chunk to update, as illustrated by block 790. Please note that while the method of FIG. 7 is described herein regarding using HRAs and compacting a heap toward lower heap addresses, the actions, processes and/or methods described regarding FIG. 7 are equally applicable to embodiments using LRAs when compacting heap toward higher heap addresses and to embodiments using pairs of LRAs and HRAs when compacting toward the middle of a heap address range.

Figure 8:
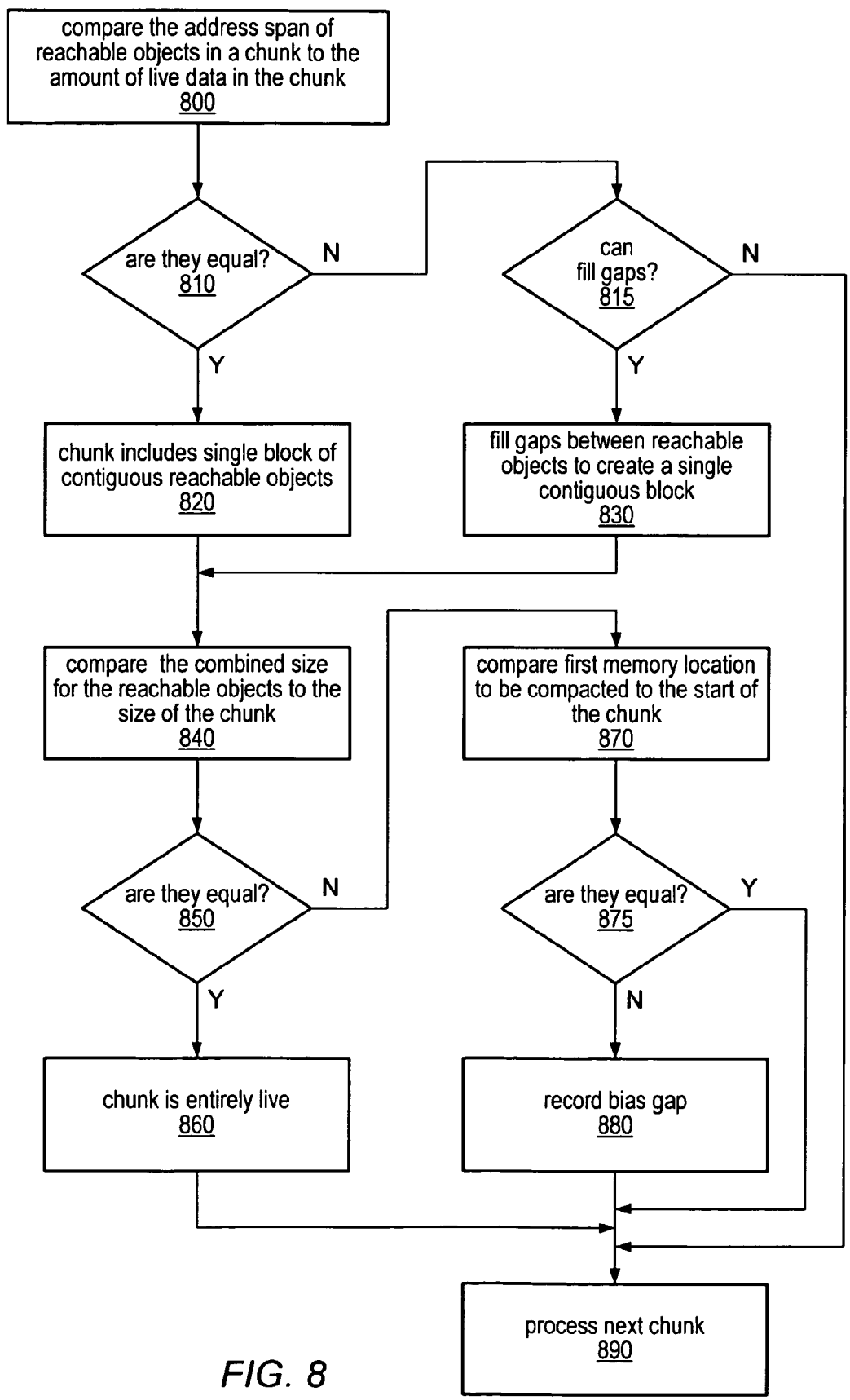
FIG. 8 is a flowchart illustrating one embodiment of a method for object relocation and reference updating during sliding compaction.

FIG. 8 is a flowchart illustrating one embodiment of a method for determining whether a chunk includes a single block of contiguous reachable objects. As described above, a heap compactor, such as heap compactor 220, may traverse the heap analyzing or processing each chunk to determine whether the chunk includes a single block of contiguous reachable objects, according to some embodiments. In one embodiment, multiple compactor threads 225 may traverse the chunks in parallel. Additionally, heap compactor and/or compactor threads 225 may determine whether a chunk includes a single block of contiguous reachable objects while also determining the chunk's post-compaction destination address, according to some embodiments. When analyzing a chunk to determine whether it includes such a block of contiguous objects or memory locations, heap compactor 220 may compare the heap address span of all the reachable objects in the chunk to the amount of live data in the chunk, as illustrated by block 800.

For example, heap compactor 220 may determine the address of the start of the first object or memory location in the chunk and the address of the end of the last object or memory location in the chunk to determine the address span of the objects, according to one embodiment. Since some objects may cross over chunk boundaries, heap compactor 220 may, in some embodiments, be configured to adjust the address span accordingly. For instance, if the first object in the chunk actually starts in the previous chunk, heap compactor 220 may use the starting address of the chunk instead of the starting address of the first object when determining the address span of the reachable objects. Similarly, if the last object in the chunk actually ends in the next chunk, heap compactor 220 may, in some embodiments, be configured to use the ending address of the chunk instead of the ending address of the last object when determining the address span of the reachable objects.

The heap compactor may then compare the address span for the reachable objects, as adjusted by the size of the chunk if required, to the amount of live data in the chunk, according to some embodiments. As noted above, the amount of live data, or, in other words, the combined size of all reachable objects in a chunk, may be stored in the per-chunk metadata for each chunk, in some embodiments. Thus, heap compactor 220 may access the per-chunk metadata for the chunk in question and compare the address span to the amount of live data in the chunk. If the address span of the reachable objects equals the amount of live data in the chunk, the chunk includes a single block of contiguous reachable objects, as illustrated by blocks 810 and 820. If they do not, the chunk does not include such a block of contiguous objects.

If a chunk does not include a single block of contiguous reachable objects, heap compactor 220 may, in some embodiments, be configured to determine whether or not to fill any gaps between the reachable objects in the chunk to create a single contiguous block of reachable objects, as illustrated by blocks 815 and 830. As described above, heap compactor 220 may be configured to follow various compaction policies regarding the size and/or number of gaps when determining whether to fill the gaps to create a block of contiguous objects. Thus, in some embodiments, only if the total size or number of the gaps is below some threshold may heap compactor 220 create a contiguous block of reachable objects. In one embodiment, heap compactor 220 may fill all gaps such that a chunk is entirely filled with a single, block of contiguous objects, while, in other embodiments, heap compactor 220 may only fill those gaps required to make a single block of objects, whether or not that block completely fills the chunk.

Heap compactor 220 may also be configured to compare the combined size of all reachable objects in the block of contiguous objects to the size of the chunk to determine whether the chunk is completely filled, as illustrated by block 840. A chunk that is completely filled may also be referred to herein as being completely or entirely live because it may contain only live, or reachable objects, with no gaps. Thus, if the combined size of all reachable objects in the block of contiguous objects equals the size of the chunk, as indicated by block 850, the chunk is entirely live, as illustrated by block 860. In some embodiments, heap compactor 220 may compare the amount of live data previously recorded, such as in pre-chunk metadata 360 to the size of the chunk to determine whether the chunk is entirely live, since the amount of live data is the combined size of all reachable objects in the chunk and since the heap compactor may have already determined that the reachable objects in the chunk form a single, contiguous block.

If, as indicated by the negative output from decision block 850, the combined size for the reachable objects is not equal to the size of the chunk, heap compactor 220 may, in some embodiments, compare the first memory location to be compacted to the start of the chunk, as indicated by block 870 to determine whether the chunk contains a bias gap between the start of the chunk and the first object or memory location to be relocated. If the first memory location to be compacted is equal to the start of the chunk, as indicated by the positive output of decision block 875, the chunk does not include a bias gap. However, if as indicated by the negative output of decision block 875, the first memory location does not equal the start of the chunk, the chunk does have a bias gap and heap compactor 220 may, according to some embodiments, record the size of the bias gap in the chunk's metadata, as illustrated by block 880. In other embodiments, however, the bias gap size may be subtracted from the destination address stored in the per-chunk metadata, as described above.

As illustrated by block 890, heap compactor 220 may then proceed to process the next chunk in the heap, regardless of whether the last chunk was completely live or not. Please note that the various steps and processes described above as part of the method for determining whether a chunk includes a single contiguous block of reachable objects may be performed in different orders and such a method may include additional or fewer steps, according to various embodiments.

Figure 9:
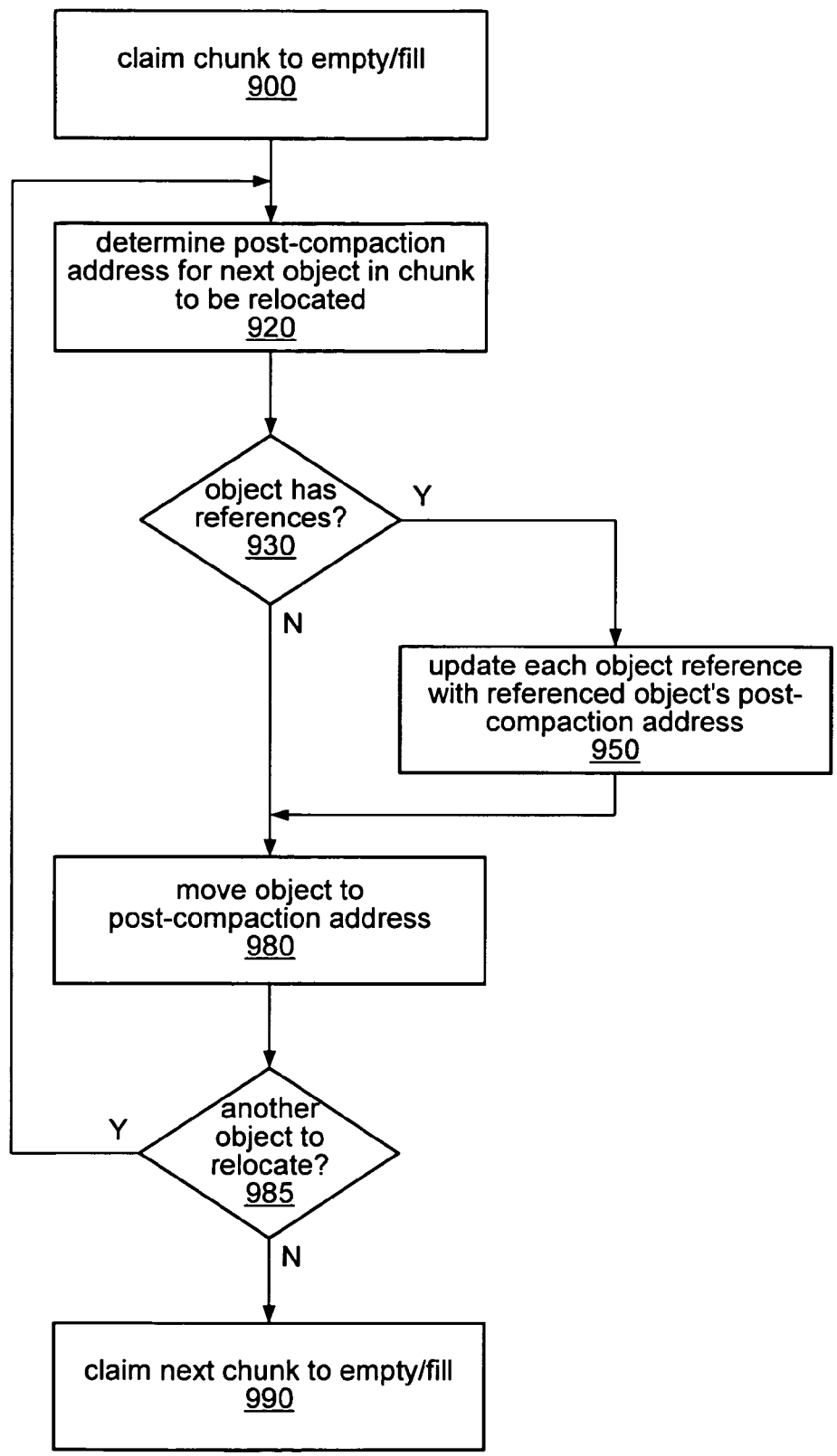
FIG. 9 is a flowchart illustrating one embodiment of a method for object relocation and reference updating during sliding compaction.

FIG. 9 is a flowchart illustrating one embodiment of a method for relocating objects and updating object references during the compacting phase of sliding compaction. After completing the marking phase, as described above, and after summing the total amount of live data in each chunk and determining each chunk's destination address (i.e. the post-compaction address for the first relocated object in the chunk), heap compactor 220, and/or multiple mark-compactor threads 225 may compact chunks in the heap, relocating the objects in a chunk and updating the object references in those objects. Please note, when determining the post-compaction destination address for a chunk, heap compactor 220 may be configured to take into account the base compaction address of the first memory address being relocated (e.g. the size of a portion of the heap not being compacted). First of all, each mark-compactor thread may claim a chunk to empty and relocate the objects in that chunk or may claim a chunk to fill and relocating objects to that chunk, as indicated by box 900.

When claiming chunks to empty, since the destination address for each chunk is known, each thread may only claim and empty a chunk whose destination area is empty to prevent overwriting objects that have not yet be relocated. Thus, in some embodiments, only after chunks spanning the destination addresses for a particular chunk have been emptied, may a thread claim that particular chunk. In other embodiments, a thread may claim a chunk, but not actual relocate any object out of that chunk until the destination chunk(s) have been emptied. This may be avoided in embodiments where threads claim chunk to fill rather then claiming chunks to empty. For example, in such embodiments, when all relocated objects have been moved out of a chunk a flag, or other indication, may be stored in the chunk's per-chunk information so that a thread may determine which chunks are available to be filled. Thus, by claiming chunks to fill rather than to empty, the thread is actually claiming an empty destination range to move objects into. As noted above, a thread may determine which objects are to be relocated to a chunk (when claiming chunks to fill) by consulting a list of such objects in the destination chunk's per-chunk information, according to some embodiments.

A mark-compactor thread may, for each object of the chunk to be relocated, determine the post-compaction address for the next object, as indicated by box 920, by adding the object's chunk offset, such as may be stored in the object's header, with the destination address for the chunk, as described above. If the object contains object references, as indicated by the positive output from box 930, heap compactor 220, or mark-compactor thread 225, may be configured to update each object reference with the referenced object's post-compaction address, as indicated by box 950. As described previously, in some embodiments, heap compactor threads may be configured to examine a chunk's HRA to determine whether or not the chunk includes at least one reference requiring updating and may also verify that all chunks at lower heap addresses that the current chunk's HRA have been updated before updating the object references in the current chunk. Please see the discussions above regarding FIGS. 6 and 7 above for more details.

When updating object references to point to the referenced object's post-compaction address, heap compactor 220 may be configured to determine the referenced object's post-compaction address by combining the chunk offset stored in the low-order bits of the object reference, with the referenced object's chunk destination address, according to some embodiments. In one embodiment, the object reference may also indicate the referenced object's associated chunk, such as in the high-order bits, and thus heap compactor 220 may access the per-chunk information for that chunk to determine the chunk post-compaction destination address (of the first relocated object in the chunk). The newly formed post-compaction address for the referenced object may then be stored in the object reference thereby making it a complete object reference for the referenced object post-compaction location.

After updating all object references in the current object, heap compactor 220 or mark-compactor thread 225 may then move the object to its post-compaction address, as indicated by block 980. If there are any more objects to relocate either into or out of the current chunk, as indicated by the positive output of box 985, heap compactor 220 may compact each one as described above. Otherwise, heap compactor 220 may claim another chunk to empty or to fill, as indicated by box 990 and according to various embodiments.

Please note that the individual functionality and processes described above regarding FIGS. 6, 7, 8, and 9 for sliding compaction represent only exemplary embodiments. Other embodiments may include additional functionality and/or processes or may perform functionality in a different order than described herein.

Figure 10:
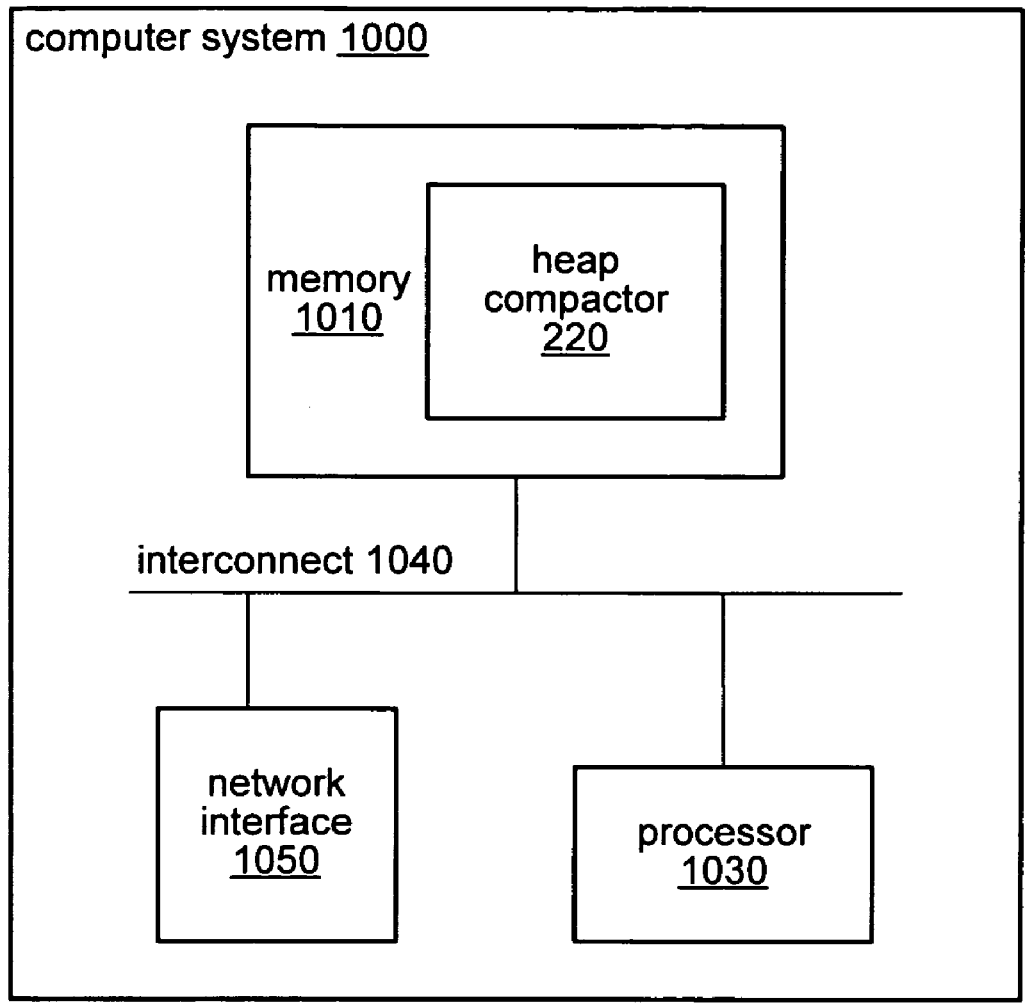
FIG. 10 is a block diagram illustrating an exemplary computer system capable of implementing sliding compaction utilizing HRA values, according to one embodiment.

FIG. 10 illustrates a computing system capable of implementing sliding heap compaction including the use of highest reference addresses, as described herein and according to various embodiments. Computer system 1000 and system 200, described above, may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device configured to manage memory in a heap.

Computer system 1000 may include at least one processor 1030. Processor 1030 may couple across interconnect 1040 to memory 1010. Memory 1010 is representative of various types of possible memory media, also referred to as "computer-accessible media" or "computer-readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 1010 may include program instructions configured to implement sliding compaction utilizing HRA information as described herein. In certain embodiments memory 1010 may include program instructions configured to implement a heap compactor, such as heap compactor 220. In such embodiments, system heap compactor 220 may include program instructions configured to implement determining, maintaining and using HRA information during sliding compaction, as described herein. A heap compactor may be implemented in any of various programming languages or methods. For example, in one embodiment, heap compactor 220 may be based on the Java programming language, while in another embodiments, heap compactor 220 may be written using the C or C++ programming languages. In additional heap compactor 220 may, in some embodiment, comprise two or more compactor threads 225 configured to perform various aspects of sliding compaction in parallel, as described herein.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method for compacting a memory heap of a computer, comprising:
   logically partitioning the heap into a plurality of chunks, wherein the heap comprises a plurality of reachable objects, wherein each of the reachable objects comprises one or more reachable memory locations, and wherein one or more of the reachable objects of one or more of the plurality of chunks comprises one or more references to a respective one or more other reachable objects of the heap;
   for each of the plurality of chunks:
      determining a range-edge referenced address referenced by the one or more references of the respective chunk;
      determining whether the range-edge referenced address for the respective chunk comprises an address within a region of the heap to be relocated during heap compaction;
      updating the one or more references of the respective chunk if the range-edge referenced address for the respective chunk comprises an address within a region of the heap to be relocated during heap compaction; and
      not updating one or more references in the respective chunk if the range-edge referenced address for the respective chunk comprises an address within a region of the heap that is not to be relocated during heap compaction.

2. The method as recited in claim 1, further comprising storing the range-edge referenced address for each respective chunk in per-chunk metadata for the respective chunk.

3. The method as recited in claim 1, wherein said determining the range-edge referenced address comprises determining the range-edge referenced address for a respective chunk in response to a process executing on the computer modifying a reference in the respective chunk to refer to an address higher than a currently determined highest referenced address for the respective chunk.

4. The method as recited in claim 1, wherein said determining the range-edge referenced address comprises determining the range-edge referenced address for a respective chunk in response to a process executing on the computer modifying a reference in the respective chunk to refer to an address lower than a currently determined lowest referenced address for the respective chunk.

5. The method as recited in claim 1, wherein said determining the range-edge referenced address comprises:
   determining one range-edge referenced address corresponding to a lowest referenced address for the respective chunk; and
   determining another range-edge reference address corresponding to a highest referenced address for the respective chunk.

6. The method as recited in claim 1, wherein said determining the range-edge referenced address comprises scanning one or more reachable objects for references.

7. The method as recited in claim 1, wherein said updating comprises:
   determining that at least one reference of at least one chunk located at an address of the heap within a range indicated by the range-edge referenced address for the respective chunk has not been updated; and
   delaying updating of the one or more references of the respective chunk until after the at least one reference of the at least one chunk is updated.

8. A system, comprising:
   a processor; and
   a memory coupled to the processor, wherein the memory comprises program instructions executable by the processor to:
      logically partition the heap into a plurality of chunks, wherein the heap comprises a plurality of reachable objects, wherein each of the reachable objects comprises one or more reachable memory locations, and wherein one or more of the reachable objects of one or more of the plurality of chunks comprises one or more references to a respective one or more other reachable objects of the heap;
      for each of the plurality of chunks:
         determine a range-edge referenced address referenced by the one or more references of the respective chunk;
         determine whether the range-edge referenced address for the respective chunk comprises an address within a region of the heap to be relocated during heap compaction;
         update the one or more references of the respective chunk if the range-edge referenced address for the respective chunk comprises an address within a region of the heap to be relocated during heap compaction; and not update one or more references in the respective chunk if the range-edge referenced address for the respective chunk comprises an address within a region of the heap that is not to be relocated during heap compaction.

9. The system of claim 8, wherein as part of determining the range-edge referenced address, the program instructions are further executable to determine the range-edge referenced address for a respective chunk in response to a process executing on the computer modifying a reference in the respective chunk to refer to an address higher than a currently determined highest referenced address for the respective chunk.

10. The system of claim 8, wherein as part of determining the range-edge referenced address, the program instructions are further executable to determine the range-edge referenced address for a respective chunk in response to a process executing on the computer modifying a reference in the respective chunk to refer to an address lower than a currently determined lowest referenced address for the respective chunk.

11. The system of claim 8, wherein as part of determining the range-edge referenced address, the program instructions are further executable to:

determine one range-edge referenced address corresponding to a lowest referenced address for the respective chunk; and determine another range-edge referenced address corresponding to a highest reference address for the respective chunk.

12. The system of claim 8, wherein as part of said determining the range-edge referenced address, the program instructions are further executable to scan one or more reachable objects for references.

13. The system of claim 8, wherein as part of said updating the program instructions are further executable to:

determine that at least one reference of at least one chunk located at an address of the heap within a range indicated by the range-edge referenced address for the respective chunk has not been updated; and delay updating of the one or more references of the respective chunk until after the at least one reference of the at least one chunk is updated.

14. A computer-readable storage medium storing program instructions computer-executable to implement:

logically partitioning the heap into a plurality of chunks, wherein the heap comprises a plurality of reachable objects, wherein each of the reachable objects comprises one or more reachable memory locations, and wherein one or more of the reachable objects of one or more of the plurality of chunks comprises one or more references to a respective one or more other reachable objects of the heap;

for each of the plurality of chunks:

determining a range-edge referenced address referenced by the one or more references of the respective chunk;

determining whether the range-edge referenced address for the respective chunk comprises an address within a region of the heap to be relocated during heap compaction;

updating the one or more references of the respective chunk if the range-edge referenced address for the respective chunk comprises an address within a region of the heap to be relocated during heap compaction; and not updating one or more references in the respective chunk if the range-edge referenced address for the respective chunk comprises an address within a region of the heap that is not to be relocated during heap compaction.

15. The computer-readable storage medium of claim 14, wherein as part of said determining the range-edge referenced address, the program instructions are executable to implement determining the range-edge referenced address for a respective chunk in response to a process executing on the computer modifying a reference in the respective chunk to refer to an address higher than a currently determined highest referenced address for the respective chunk.

16. The computer-readable storage medium of claim 14, wherein as part of said determining the range-edge referenced address, the program instructions are executable to implement determining the range-edge referenced address for a respective chunk in response to a process executing on the computer modifying a reference in the respective chunk to refer to an address lower than a currently determined lowest referenced address for the respective chunk.

17. The computer-readable storage medium of claim 14, wherein as part of said determining the range-edge referenced address, the program instructions are executable to implement:

determining one range-edge referenced address corresponding to a lowest referenced address for the respective chunk; and determining another range-edge referenced address corresponding to a highest referenced address for the respective chunk.

\* \* \* \* \*